US011554984B2

(12) United States Patent
Gross et al.

(10) Patent No.: US 11,554,984 B2
(45) Date of Patent: Jan. 17, 2023

(54) ALKALI-FREE BOROSILICATE GLASSES WITH LOW POST-HF ETCH ROUGHNESS

(71) Applicant: Corning Incorporated, Corning, NY (US)

(72) Inventors: Timothy Michael Gross, Corning, NY (US); Yuhui Jin, Painted Post, NY (US); Ruchirej Yongsunthon, Painted Post, NY (US); Liying Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 733 days.

(21) Appl. No.: 16/272,305

(22) Filed: Feb. 11, 2019

(65) Prior Publication Data

US 2019/0256404 A1 Aug. 22, 2019

Related U.S. Application Data

(60) Provisional application No. 62/633,835, filed on Feb. 22, 2018.

(51) Int. Cl.
C03C 3/097 (2006.01)
C03C 15/00 (2006.01)
C03C 23/00 (2006.01)
C03C 15/02 (2006.01)
C03C 3/093 (2006.01)
C03C 3/087 (2006.01)

(52) U.S. Cl.
CPC ............. *C03C 3/097* (2013.01); *C03C 3/087* (2013.01); *C03C 3/093* (2013.01); *C03C 15/00* (2013.01); *C03C 15/02* (2013.01); *C03C 23/0025* (2013.01); *C03C 2204/08* (2013.01)

(58) Field of Classification Search
CPC ......... C03C 3/083; C03C 3/085; C03C 3/087; C03C 3/091; C03C 3/093; C03C 3/097; C03C 15/00; C03C 15/02; C03C 23/0025; C03C 2204/08
See application file for complete search history.

(56) References Cited

U.S. PATENT DOCUMENTS

| 108,387 A | 10/1870 | Pike |
| 208,387 A | 9/1878 | George |
| 237,571 A | 2/1881 | Messier |
| 1,790,397 A | 1/1931 | Woods et al. |
| 2,682,134 A | 6/1954 | Stookey |
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,713,921 A | 1/1973 | Fleischer et al. |
| 3,729,302 A | 4/1973 | Heaton |
| 3,775,084 A | 11/1973 | Heaton |
| 3,798,013 A | 3/1974 | Hasegawa et al. |
| 4,226,607 A | 10/1980 | Domken |
| 4,395,271 A | 7/1983 | Beall et al. |
| 4,441,008 A | 4/1984 | Chan |
| 4,546,231 A | 10/1985 | Gresser et al. |
| 4,547,836 A | 10/1985 | Anthony |
| 4,564,579 A | 1/1986 | Morita et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,948,941 A | 8/1990 | Altman et al. |
| 5,022,959 A | 6/1991 | Itoh et al. |
| 5,035,918 A | 7/1991 | Vyas |
| 5,040,182 A | 8/1991 | Spinelli et al. |
| 5,089,062 A | 2/1992 | Pavlik et al. |
| 5,102,498 A | 4/1992 | Itoh et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |

(Continued)

FOREIGN PATENT DOCUMENTS

| AU | 2004276725 A1 | 4/2005 |
| AU | 2011101310 A4 | 11/2011 |

(Continued)

OTHER PUBLICATIONS

Koike et al; "P-33: Cu—Mn Electrodes for a-Si TFT and Its Electrical Characteristics"; SID Symposium Digest of Technical Papers, 41:1, 1343-1346 (2010).

Koike et al; "Self-Forming Diffusion Barrier Layer in Cu—Mn Alloy Metallization"; Appl. Phys. Lett. 87, 041911-1-041911-3 (2005).

Kondo et al., Three-Dimensional Microdrilling of Glass by Multiphoton Process and Chemical Etching, 1999, Japanese Journal of Applied Physics, vol. 38, Part 2, No. 10A (Year: 1999).

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

(Continued)

*Primary Examiner* — Elizabeth A. Bolden
(74) *Attorney, Agent, or Firm* — Amy T. Lang

(57) ABSTRACT

An article comprises a glass substrate. The glass substrate has a first surface having a plurality of vias therein, and a second surface parallel to the first surface. At least one of the first surface and the second surface is an etched surface having a surface roughness (Ra) of 0.75 nm or less. The glass substrate comprises, in mol percent on an oxide basis: 65 mol % ≤ $SiO_2$ ≤ 75 mol %; 7 mol % ≤ $Al_2O_3$ ≤ 15 mol %; 26.25 mol % ≤ $RO+Al_2O_3-B_2O_3$; 0 mol % ≤ $R_2O$ ≤ 2 mol %. RO=$MgO+CaO+SrO+BaO+ZnO$. $R_2O=Li_2O+Na_2O+K_2O+Rb_2O+Cs_2O$.

17 Claims, 7 Drawing Sheets

(56) References Cited

U.S. PATENT DOCUMENTS

| | | |
|---|---|---|
| 5,166,493 A | 11/1992 | Inagawa et al. |
| 5,208,068 A | 5/1993 | Davis et al. |
| 5,265,107 A | 11/1993 | Delfyett, Jr. |
| 5,314,522 A | 5/1994 | Kondo et al. |
| 5,374,291 A | 12/1994 | Yabe et al. |
| 5,400,350 A | 3/1995 | Galvanauskas |
| 5,434,875 A | 7/1995 | Rieger et al. |
| 5,436,925 A | 7/1995 | Lin et al. |
| 5,457,836 A | 10/1995 | Wiedeck |
| 5,493,096 A | 2/1996 | Koh |
| 5,553,093 A | 9/1996 | Ramaswamy et al. |
| 5,574,597 A | 11/1996 | Kataoka |
| 5,575,291 A | 11/1996 | Hayakawa et al. |
| 5,575,936 A | 11/1996 | Goldfarb |
| 5,586,138 A | 12/1996 | Yokoyama |
| 5,696,782 A | 12/1997 | Harter et al. |
| 5,736,709 A | 4/1998 | Neiheisel |
| 5,745,236 A | 4/1998 | Haga |
| 5,746,884 A | 5/1998 | Gupta et al. |
| 5,776,220 A | 7/1998 | Allaire et al. |
| 5,844,200 A | 12/1998 | Leader et al. |
| 5,879,424 A | 3/1999 | Nishii et al. |
| 5,909,284 A | 6/1999 | Nakamura |
| 5,919,607 A | 7/1999 | Lawandy |
| 5,933,230 A | 8/1999 | Imaino et al. |
| 5,965,043 A | 10/1999 | Noddin et al. |
| 6,016,223 A | 1/2000 | Suzuki et al. |
| 6,016,324 A | 1/2000 | Rieger et al. |
| 6,055,829 A | 5/2000 | Witzmann et al. |
| 6,072,624 A | 6/2000 | Dixon et al. |
| 6,078,599 A | 6/2000 | Everage et al. |
| 6,120,131 A | 9/2000 | Murthy et al. |
| 6,140,243 A | 10/2000 | Wallace et al. |
| 6,143,382 A | 11/2000 | Koyama et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,224,713 B1 | 5/2001 | Hembree et al. |
| 6,234,755 B1 | 5/2001 | Bunker et al. |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,319,867 B1 | 11/2001 | Chacon et al. |
| 6,322,958 B1 | 11/2001 | Hayashi |
| 6,338,901 B1 | 1/2002 | Veerasamy |
| 6,339,208 B1 | 1/2002 | Rockstroh et al. |
| 6,344,242 B1 | 2/2002 | Stolk et al. |
| 6,373,565 B1 | 4/2002 | Kafka et al. |
| 6,381,391 B1 | 4/2002 | Islam et al. |
| 6,391,213 B1 | 5/2002 | Homola |
| 6,396,856 B1 | 5/2002 | Sucha et al. |
| 6,399,914 B1 | 6/2002 | Troitski |
| 6,407,360 B1 | 6/2002 | Choo et al. |
| 6,420,088 B1 | 7/2002 | Angelopoulos et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,537,937 B1 | 3/2003 | Nishizawa et al. |
| 6,552,301 B2 | 4/2003 | Herman et al. |
| 6,563,079 B1 | 5/2003 | Umetsu et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,737,345 B1 | 5/2004 | Lin et al. |
| 6,744,009 B1 | 6/2004 | Xuan et al. |
| 6,754,429 B2 | 6/2004 | Borrelli et al. |
| 6,787,732 B1 | 9/2004 | Xuan et al. |
| 6,794,605 B2 | 9/2004 | Park et al. |
| 6,800,237 B1 | 10/2004 | Yamamoto et al. |
| 6,800,831 B1 | 10/2004 | Hoetzel |
| 6,906,795 B2 | 6/2005 | Goto et al. |
| 6,958,094 B2 | 10/2005 | Ohmi et al. |
| 6,990,285 B2 | 1/2006 | Schroeder et al. |
| 6,992,026 B2 | 1/2006 | Fukuyo et al. |
| 6,992,030 B2 | 1/2006 | Paulson |
| 7,008,817 B2 | 3/2006 | Kim et al. |
| 7,009,138 B2 | 3/2006 | Amako et al. |
| 7,019,257 B2 | 3/2006 | Stevens |
| 7,033,519 B2 | 4/2006 | Taylor et al. |
| 7,043,072 B2 | 5/2006 | Goto et al. |
| 7,057,135 B2 | 6/2006 | Li |
| 7,084,073 B2 | 8/2006 | Lee et al. |
| 7,211,899 B2 | 5/2007 | Taniguchi et al. |
| 7,337,540 B2 | 3/2008 | Kurosawa |
| 7,353,829 B1 | 4/2008 | Wachter et al. |
| 7,407,889 B2 | 8/2008 | Tsunetomo et al. |
| 7,511,886 B2 | 3/2009 | Schultz et al. |
| 7,528,967 B2 | 5/2009 | Okawauchi et al. |
| 7,534,734 B2 | 5/2009 | Ellison |
| 7,535,634 B1 | 5/2009 | Savchenkov et al. |
| 7,626,665 B2 | 12/2009 | Koike |
| 7,633,033 B2 | 12/2009 | Thomas et al. |
| 7,642,483 B2 | 1/2010 | You et al. |
| 7,649,153 B2 | 1/2010 | Haight et al. |
| 7,683,370 B2 | 3/2010 | Kugimiya et al. |
| 7,726,532 B2 | 6/2010 | Gonoe |
| 7,749,809 B2 | 7/2010 | How et al. |
| 7,763,559 B2 | 7/2010 | Kurachi et al. |
| 7,772,115 B2 | 8/2010 | Hiatt |
| 7,777,275 B2 | 8/2010 | Lee |
| 7,836,727 B2 | 11/2010 | Nishiyama |
| 7,880,117 B2 | 2/2011 | Li et al. |
| 7,981,810 B1 | 7/2011 | Subramonium et al. |
| 7,994,503 B2 | 8/2011 | Hino et al. |
| 8,007,913 B2 | 8/2011 | Coppola et al. |
| 8,021,950 B1 | 9/2011 | Abadeer et al. |
| 8,104,385 B2 | 1/2012 | Hayashi et al. |
| 8,118,971 B2 | 2/2012 | Hori et al. |
| 8,119,462 B2 | 2/2012 | Takasawa et al. |
| 8,132,427 B2 | 3/2012 | Brown et al. |
| 8,163,649 B2 | 4/2012 | Koike et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,257,603 B2 | 9/2012 | Logunov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,303,754 B2 | 11/2012 | Higuchi |
| 8,307,672 B2 | 11/2012 | Hidaka et al. |
| 8,327,666 B2 | 12/2012 | Harvey et al. |
| 8,338,957 B2 | 12/2012 | Nilsson |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,384,083 B2 | 2/2013 | Mori et al. |
| 8,411,459 B2 | 4/2013 | Yu et al. |
| 8,444,906 B2 | 5/2013 | Lee et al. |
| 8,448,471 B2 | 5/2013 | Kumatani et al. |
| 8,455,378 B2 | 6/2013 | Yanase et al. |
| 8,482,189 B2 | 7/2013 | Goto et al. |
| 8,518,280 B2 | 8/2013 | Hsu et al. |
| 8,531,679 B2 | 9/2013 | Scheiner |
| 8,533,942 B2 | 9/2013 | Ohashi et al. |
| 8,535,997 B2 | 9/2013 | Kawakami et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |

(56) References Cited

U.S. PATENT DOCUMENTS

| | | |
|---|---|---|
| 8,643,129 B2 | 2/2014 | Laming et al. |
| 8,670,182 B2 | 3/2014 | Tanida et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,699,037 B2 | 4/2014 | Cox |
| 8,720,228 B2 | 5/2014 | Li |
| 8,742,588 B2 | 6/2014 | Nilsson et al. |
| 8,796,165 B2 | 8/2014 | Ellison et al. |
| 8,826,696 B2 | 9/2014 | Brown et al. |
| 8,835,335 B2 | 9/2014 | Murata et al. |
| 8,852,698 B2 | 10/2014 | Fukumitsu |
| 8,871,641 B2 | 10/2014 | Nilsson |
| 8,873,067 B2 | 10/2014 | Lee et al. |
| 8,887,529 B2 | 11/2014 | Lu et al. |
| 8,916,798 B2 | 12/2014 | Pluss |
| 8,943,855 B2 | 2/2015 | Gomez et al. |
| 8,971,053 B2 | 3/2015 | Kariya et al. |
| 8,980,727 B1 | 3/2015 | Lei et al. |
| 8,993,465 B2 | 3/2015 | Ellison et al. |
| 8,999,179 B2 | 4/2015 | Yu et al. |
| 9,023,421 B2 | 5/2015 | Nakashima |
| 9,024,443 B2 | 5/2015 | Inaba et al. |
| 9,093,381 B2 | 7/2015 | Barriere et al. |
| 9,138,913 B2 | 9/2015 | Arai et al. |
| 9,140,539 B2 | 9/2015 | Scheiner |
| 9,227,868 B2 | 1/2016 | Matsumoto et al. |
| 9,232,652 B2 | 1/2016 | Fushie et al. |
| 9,263,300 B2 | 2/2016 | Tsai et al. |
| 9,278,886 B2 | 3/2016 | Boek et al. |
| 9,285,593 B1 | 3/2016 | Laskin et al. |
| 9,290,407 B2 | 3/2016 | Barefoot et al. |
| 9,296,066 B2 | 3/2016 | Hosseini et al. |
| 9,296,646 B2 | 3/2016 | Burket et al. |
| 9,305,470 B2 | 4/2016 | Miki et al. |
| 9,321,680 B2 | 4/2016 | Chuang et al. |
| 9,324,791 B2 | 4/2016 | Tamemoto |
| 9,327,381 B2 | 5/2016 | Lee et al. |
| 9,346,706 B2 | 5/2016 | Bazemore et al. |
| 9,377,583 B2 | 6/2016 | Giaretta et al. |
| 9,425,125 B2 | 8/2016 | Shen |
| 9,442,377 B1 | 9/2016 | Ongayi et al. |
| 9,446,590 B2 | 9/2016 | Chen et al. |
| 9,481,598 B2 | 11/2016 | Bergh et al. |
| 9,517,963 B2 | 12/2016 | Marjanovic et al. |
| 9,676,046 B2 | 6/2017 | Hamada et al. |
| 9,745,220 B2 | 8/2017 | Burket et al. |
| 9,758,876 B2 | 9/2017 | Shorey et al. |
| 9,760,986 B2 | 9/2017 | Ramamurthy et al. |
| 9,815,730 B2 | 11/2017 | Marjanovic et al. |
| 9,832,868 B1 | 11/2017 | Wright et al. |
| 9,850,160 B2 | 12/2017 | Marjanovic et al. |
| 9,953,912 B2 | 4/2018 | Goers |
| 10,144,093 B2 | 12/2018 | Marjanovic et al. |
| 10,203,476 B2 | 2/2019 | Cui |
| 2001/0009250 A1 | 7/2001 | Herman et al. |
| 2002/0005805 A1 | 1/2002 | Ogura et al. |
| 2002/0041946 A1 | 4/2002 | Abe |
| 2002/0046997 A1 | 4/2002 | Nam et al. |
| 2002/0051563 A1 | 5/2002 | Goto et al. |
| 2002/0052125 A1 | 5/2002 | Shaffer et al. |
| 2002/0062563 A1 | 5/2002 | Koide et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2002/0137344 A1 | 9/2002 | Jordan et al. |
| 2002/0180015 A1 | 12/2002 | Yamaguchi et al. |
| 2002/0182871 A1 | 12/2002 | Lu et al. |
| 2003/0006221 A1 | 1/2003 | Hong et al. |
| 2003/0007772 A1 | 1/2003 | Borrelli et al. |
| 2003/0045420 A1 | 3/2003 | Koyama et al. |
| 2003/0137056 A1 | 7/2003 | Taniguchi et al. |
| 2003/0150839 A1 | 8/2003 | Kobayashi et al. |
| 2003/0206651 A1 | 11/2003 | Goto et al. |
| 2003/0217568 A1 | 11/2003 | Koyo et al. |
| 2003/0235385 A1 | 12/2003 | Taylor et al. |
| 2004/0000534 A1 | 1/2004 | Lipinski |
| 2004/0013951 A1 | 1/2004 | Wang |
| 2004/0022487 A1 | 2/2004 | Nagasaka et al. |
| 2004/0058476 A1 | 3/2004 | Enquist et al. |
| 2004/0061705 A1 | 4/2004 | Yoon et al. |
| 2004/0092105 A1 | 5/2004 | Lee et al. |
| 2004/0094524 A1 | 5/2004 | Stevens |
| 2004/0152229 A1 | 8/2004 | Najafi et al. |
| 2004/0188393 A1 | 9/2004 | Li et al. |
| 2004/0217455 A1 | 11/2004 | Shiono et al. |
| 2004/0221615 A1 | 11/2004 | Postupack et al. |
| 2004/0223704 A1 | 11/2004 | Fujii et al. |
| 2004/0256619 A1 | 12/2004 | Nomura et al. |
| 2005/0009315 A1 | 1/2005 | Kim et al. |
| 2005/0023246 A1 | 2/2005 | McEntee et al. |
| 2005/0024743 A1 | 2/2005 | Camy-Peyret |
| 2005/0029238 A1 | 2/2005 | Chen |
| 2005/0033184 A1 | 2/2005 | Christoph |
| 2005/0079650 A1 | 4/2005 | Mancini et al. |
| 2005/0098458 A1 | 5/2005 | Gruetzmacher et al. |
| 2005/0098548 A1 | 5/2005 | Kobayashi et al. |
| 2005/0106874 A1 | 5/2005 | Matsui et al. |
| 2005/0112506 A1 | 5/2005 | Czech et al. |
| 2005/0115938 A1 | 6/2005 | Sawaki et al. |
| 2005/0142364 A1 | 6/2005 | Aitken |
| 2005/0142812 A1 | 6/2005 | Kurosawa |
| 2005/0158538 A1 | 7/2005 | Li et al. |
| 2005/0202683 A1 | 9/2005 | Wang et al. |
| 2005/0266320 A1 | 12/2005 | Amemiya |
| 2005/0274702 A1 | 12/2005 | Deshi |
| 2006/0011593 A1 | 1/2006 | Fukuyo et al. |
| 2006/0012766 A1 | 1/2006 | Klosner et al. |
| 2006/0019814 A1 | 1/2006 | Baik et al. |
| 2006/0039160 A1 | 2/2006 | Cassarly et al. |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0192978 A1 | 8/2006 | Laguarta et al. |
| 2006/0194916 A1 | 8/2006 | Zhong et al. |
| 2006/0207976 A1 | 9/2006 | Bovatsek et al. |
| 2006/0219676 A1 | 10/2006 | Taylor et al. |
| 2006/0227440 A1 | 10/2006 | Gluckstad |
| 2006/0270232 A1 | 11/2006 | Kawamura et al. |
| 2006/0289410 A1 | 12/2006 | Morita et al. |
| 2006/0290232 A1 | 12/2006 | Fujita et al. |
| 2006/0292877 A1 | 12/2006 | Lake |
| 2007/0045779 A1 | 3/2007 | Hiatt |
| 2007/0051706 A1 | 3/2007 | Bovatsek et al. |
| 2007/0111390 A1 | 5/2007 | Komura et al. |
| 2007/0111480 A1 | 5/2007 | Maruyama et al. |
| 2007/0117044 A1 | 5/2007 | Ogihara et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0181543 A1 | 8/2007 | Urairi et al. |
| 2007/0190340 A1 | 8/2007 | Coppola et al. |
| 2007/0202619 A1 | 8/2007 | Tamura et al. |
| 2007/0232028 A1 | 10/2007 | Lee et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2008/0194109 A1 | 8/2008 | Ishibashi et al. |
| 2008/0206690 A1 | 8/2008 | Kennedy et al. |
| 2008/0212185 A1 | 9/2008 | Fuse |
| 2008/0245109 A1 | 10/2008 | Flemming et al. |
| 2008/0314883 A1 | 12/2008 | Juodkazis et al. |
| 2009/0013724 A1 | 1/2009 | Koyo et al. |
| 2009/0029189 A1 | 1/2009 | Moriwaki et al. |
| 2009/0032510 A1 | 2/2009 | Ando et al. |
| 2009/0075087 A1 | 3/2009 | Xu et al. |
| 2009/0098351 A1 | 4/2009 | Kishi |
| 2009/0151996 A1 | 6/2009 | Mishima et al. |
| 2009/0176034 A1 | 7/2009 | Ruuttu et al. |
| 2009/0183764 A1 | 7/2009 | Meyer |
| 2009/0219491 A1 | 9/2009 | Williams et al. |
| 2009/0242528 A1 | 10/2009 | Howerton et al. |
| 2009/0250446 A1 | 10/2009 | Sakamoto |

(56) References Cited

U.S. PATENT DOCUMENTS

| | | |
|---|---|---|
| 2009/0286091 A1 | 11/2009 | Danielson et al. |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0000259 A1 | 1/2010 | Ukrainczyk et al. |
| 2010/0015439 A1 | 1/2010 | Buether et al. |
| 2010/0015454 A1 | 1/2010 | Anderson et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0050692 A1 | 3/2010 | Logunov et al. |
| 2010/0068453 A1 | 3/2010 | Imai et al. |
| 2010/0080961 A1 | 4/2010 | Okamura et al. |
| 2010/0086741 A1 | 4/2010 | Bovatsek et al. |
| 2010/0086870 A1 | 4/2010 | Ogihara et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0119808 A1 | 5/2010 | Li et al. |
| 2010/0119846 A1 | 5/2010 | Sawada |
| 2010/0129603 A1 | 5/2010 | Blick et al. |
| 2010/0133697 A1 | 6/2010 | Nilsson |
| 2010/0147813 A1 | 6/2010 | Lei et al. |
| 2010/0178732 A1 | 7/2010 | Wu et al. |
| 2010/0206008 A1 | 8/2010 | Harvey et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0279509 A1 | 11/2010 | Kim et al. |
| 2010/0284027 A1 | 11/2010 | Scheiner |
| 2010/0287991 A1 | 11/2010 | Brown et al. |
| 2010/0289115 A1 | 11/2010 | Akiyama et al. |
| 2010/0289186 A1 | 11/2010 | Longo et al. |
| 2010/0291353 A1 | 11/2010 | Dejneka et al. |
| 2010/0292068 A1 | 11/2010 | Takaya et al. |
| 2010/0307809 A1 | 12/2010 | Noda et al. |
| 2010/0320179 A1 | 12/2010 | Morita et al. |
| 2010/0326138 A1 | 12/2010 | Kumatani et al. |
| 2011/0003619 A1 | 1/2011 | Fujii |
| 2011/0032467 A1 | 2/2011 | Koike |
| 2011/0045239 A1 | 2/2011 | Takaya et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0123787 A1 | 5/2011 | Tomamoto et al. |
| 2011/0132881 A1 | 6/2011 | Liu |
| 2011/0132883 A1 | 6/2011 | Sheng et al. |
| 2011/0183116 A1 | 7/2011 | Hung et al. |
| 2011/0187025 A1 | 8/2011 | Costin, Sr. |
| 2011/0189847 A1 | 8/2011 | Tsai et al. |
| 2011/0195360 A1 | 8/2011 | Flemming et al. |
| 2011/0201197 A1 | 8/2011 | Nilsson et al. |
| 2011/0204528 A1 | 8/2011 | Matsutani et al. |
| 2011/0229687 A1 | 9/2011 | Gu et al. |
| 2011/0240611 A1 | 10/2011 | Sandstroem |
| 2011/0248405 A1 | 10/2011 | Li et al. |
| 2011/0256344 A1 | 10/2011 | Ono et al. |
| 2011/0259373 A1 | 10/2011 | Hotta et al. |
| 2011/0259860 A1 | 10/2011 | Bass et al. |
| 2011/0277507 A1 | 11/2011 | Lu et al. |
| 2011/0300908 A1 | 12/2011 | Grespan et al. |
| 2011/0308942 A1 | 12/2011 | Liu et al. |
| 2011/0316561 A1 | 12/2011 | Tinsley et al. |
| 2011/0318555 A1 | 12/2011 | Bookbinder et al. |
| 2011/0318561 A1 | 12/2011 | Murata et al. |
| 2012/0013196 A1 | 1/2012 | Kim et al. |
| 2012/0017642 A1 | 1/2012 | Teranishi et al. |
| 2012/0047951 A1 | 3/2012 | Dannoux et al. |
| 2012/0047956 A1 | 3/2012 | Li |
| 2012/0048604 A1 | 3/2012 | Cornejo et al. |
| 2012/0050692 A1 | 3/2012 | Gollier |
| 2012/0052302 A1 | 3/2012 | Matusick et al. |
| 2012/0061440 A1 | 3/2012 | Roell |
| 2012/0064306 A1 | 3/2012 | Kang et al. |
| 2012/0092681 A1 | 4/2012 | Cox |
| 2012/0103018 A1 | 5/2012 | Lu et al. |
| 2012/0105095 A1 | 5/2012 | Bryant et al. |
| 2012/0111057 A1 | 5/2012 | Barefoot et al. |
| 2012/0125892 A1 | 5/2012 | Shimoi et al. |
| 2012/0125893 A1 | 5/2012 | Shimoi et al. |
| 2012/0129359 A1 | 5/2012 | Shimoi et al. |
| 2012/0130004 A1 | 5/2012 | Xu et al. |
| 2012/0131958 A1 | 5/2012 | Shimoi et al. |
| 2012/0131962 A1 | 5/2012 | Mitsugi et al. |
| 2012/0135177 A1 | 5/2012 | Cornejo et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0135852 A1 | 5/2012 | Ellison et al. |
| 2012/0135853 A1 | 5/2012 | Amin et al. |
| 2012/0141668 A1 | 6/2012 | Nakashima |
| 2012/0142136 A1 | 6/2012 | Horning et al. |
| 2012/0145331 A1 | 6/2012 | Gomez et al. |
| 2012/0168412 A1 | 7/2012 | Hooper |
| 2012/0196071 A1 | 8/2012 | Cornejo et al. |
| 2012/0205356 A1 | 8/2012 | Pluess |
| 2012/0211923 A1 | 8/2012 | Garner et al. |
| 2012/0214006 A1 | 8/2012 | Chen et al. |
| 2012/0234049 A1 | 9/2012 | Bolton |
| 2012/0234807 A1 | 9/2012 | Sercel et al. |
| 2012/0235969 A1 | 9/2012 | Burns et al. |
| 2012/0241919 A1 | 9/2012 | Mitani |
| 2012/0255935 A1 | 10/2012 | Kakui et al. |
| 2012/0261697 A1 | 10/2012 | Margalit et al. |
| 2012/0276483 A1 | 11/2012 | Ogihara et al. |
| 2012/0276743 A1 | 11/2012 | Won et al. |
| 2012/0299203 A1 | 11/2012 | Sugo et al. |
| 2012/0299219 A1 | 11/2012 | Shimoi et al. |
| 2012/0302139 A1 | 11/2012 | Darcangelo et al. |
| 2012/0308803 A1 | 12/2012 | Dejneka et al. |
| 2013/0019637 A1 | 1/2013 | Sol et al. |
| 2013/0029092 A1 | 1/2013 | Wakioka |
| 2013/0034688 A1 | 2/2013 | Koike et al. |
| 2013/0044371 A1 | 2/2013 | Rupp et al. |
| 2013/0050226 A1 | 2/2013 | Shenoy et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0078891 A1 | 3/2013 | Lee et al. |
| 2013/0089701 A1 | 4/2013 | Hooper et al. |
| 2013/0091897 A1 | 4/2013 | Fujii et al. |
| 2013/0105213 A1 | 5/2013 | Hu et al. |
| 2013/0118793 A1 | 5/2013 | Teshima et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0135745 A1 | 5/2013 | Tanida et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0163801 A1 | 6/2013 | Ha et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 8/2013 | Black et al. |
| 2013/0205835 A1 | 8/2013 | Giaretta et al. |
| 2013/0209731 A1 | 8/2013 | Nattermann et al. |
| 2013/0210245 A1 | 8/2013 | Jackl |
| 2013/0213467 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0224492 A1 | 8/2013 | Bookbinder et al. |
| 2013/0228918 A1 | 9/2013 | Chen et al. |
| 2013/0247615 A1 | 9/2013 | Boek et al. |
| 2013/0255779 A1 | 10/2013 | Aitken et al. |
| 2013/0266757 A1 | 10/2013 | Giron et al. |
| 2013/0270240 A1 | 10/2013 | Kondo |

(56) References Cited

U.S. PATENT DOCUMENTS

| | | |
|---|---|---|
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0330515 A1 | 12/2013 | Oh et al. |
| 2013/0334185 A1 | 12/2013 | Nomaru |
| 2013/0337599 A1 | 12/2013 | Yun |
| 2013/0340480 A1 | 12/2013 | Nattermann et al. |
| 2014/0015121 A1 | 1/2014 | Koizumi et al. |
| 2014/0027951 A1 | 1/2014 | Srinivas et al. |
| 2014/0034374 A1 | 2/2014 | Cornejo et al. |
| 2014/0034730 A1 | 2/2014 | Lee |
| 2014/0042202 A1 | 2/2014 | Lee |
| 2014/0044143 A1 | 2/2014 | Clarkson et al. |
| 2014/0047957 A1 | 2/2014 | Wu |
| 2014/0054618 A1 | 2/2014 | Li |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0116091 A1 | 5/2014 | Chuang et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0154439 A1 | 6/2014 | Demartino et al. |
| 2014/0165652 A1 | 6/2014 | Saito |
| 2014/0166199 A1 | 6/2014 | Bellman et al. |
| 2014/0170378 A1 | 6/2014 | Bellman et al. |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0231390 A1 | 8/2014 | Nukaga et al. |
| 2014/0235796 A1 | 8/2014 | Ogihara et al. |
| 2014/0242375 A1 | 8/2014 | Mauro et al. |
| 2014/0254004 A1 | 9/2014 | Wooder et al. |
| 2014/0290310 A1 | 10/2014 | Green |
| 2014/0300728 A1 | 10/2014 | Drescher et al. |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1 | 11/2014 | Bergh et al. |
| 2014/0342897 A1 | 11/2014 | Amin et al. |
| 2014/0347083 A1 | 11/2014 | Bryant et al. |
| 2014/0361463 A1 | 12/2014 | Desimone et al. |
| 2014/0376006 A1 | 12/2014 | Scheiner |
| 2015/0021513 A1 | 1/2015 | Kim et al. |
| 2015/0027757 A1 | 1/2015 | Shin et al. |
| 2015/0036065 A1 | 2/2015 | Yousefpor et al. |
| 2015/0037553 A1 | 2/2015 | Mauro |
| 2015/0038313 A1 | 2/2015 | Hosseini |
| 2015/0051060 A1 | 2/2015 | Ellison et al. |
| 2015/0054136 A1 | 2/2015 | Ebefors et al. |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0093908 A1 | 4/2015 | Reddy et al. |
| 2015/0102498 A1 | 4/2015 | Enicks et al. |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140299 A1 | 5/2015 | Ellison et al. |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0173191 A1 | 6/2015 | Takahashi |
| 2015/0183679 A1 | 7/2015 | Saito |
| 2015/0232369 A1 | 8/2015 | Marjanovic et al. |
| 2015/0274583 A1 | 10/2015 | An et al. |
| 2015/0299018 A1 | 10/2015 | Bhuyan et al. |
| 2015/0306847 A1 | 10/2015 | Bellman et al. |
| 2015/0329415 A1 | 11/2015 | Bellman et al. |
| 2015/0360991 A1 | 12/2015 | Grundmueller et al. |
| 2015/0367442 A1 | 12/2015 | Bovatsek et al. |
| 2015/0368145 A1 | 12/2015 | Senshu et al. |
| 2015/0376050 A1 | 12/2015 | Nakamura et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0026842 A1 | 1/2016 | Withers et al. |
| 2016/0031745 A1 | 2/2016 | Ortner et al. |
| 2016/0035587 A1 | 2/2016 | Keech et al. |
| 2016/0059359 A1 | 3/2016 | Krueger et al. |
| 2016/0060156 A1 | 3/2016 | Krueger et al. |
| 2016/0102009 A1 | 4/2016 | Boek et al. |
| 2016/0107925 A1 | 4/2016 | Burket et al. |
| 2016/0122229 A1* | 5/2016 | Bowden ................. C03C 3/093 |
| | | 501/67 |
| 2016/0145149 A1 | 5/2016 | Burket et al. |
| 2016/0152516 A1 | 6/2016 | Bazemore et al. |
| 2016/0166395 A9 | 6/2016 | Weiman |
| 2016/0199944 A1 | 7/2016 | Hosseini |
| 2016/0200621 A1 | 7/2016 | N'Gom et al. |
| 2016/0201474 A1 | 7/2016 | Slavens et al. |
| 2016/0204126 A1 | 7/2016 | Amano |
| 2016/0208387 A1 | 7/2016 | Liu et al. |
| 2016/0219704 A1 | 7/2016 | Vandemeer et al. |
| 2016/0237571 A1 | 8/2016 | Liu et al. |
| 2016/0280580 A1 | 9/2016 | Bohme |
| 2016/0282584 A1 | 9/2016 | Cui |
| 2016/0289669 A1 | 10/2016 | Fan et al. |
| 2016/0290791 A1 | 10/2016 | Buono et al. |
| 2016/0305764 A1 | 10/2016 | Cui et al. |
| 2016/0311717 A1 | 10/2016 | Nieber et al. |
| 2016/0312365 A1 | 10/2016 | Cordonier et al. |
| 2016/0322291 A1 | 11/2016 | Goers |
| 2016/0327744 A1 | 11/2016 | Giaretta et al. |
| 2016/0334203 A1 | 11/2016 | Cui et al. |
| 2016/0351410 A1 | 12/2016 | Fu et al. |
| 2016/0352023 A1 | 12/2016 | Dang et al. |
| 2016/0362331 A1 | 12/2016 | Castle et al. |
| 2016/0368100 A1 | 12/2016 | Marjanovic et al. |
| 2017/0002601 A1 | 1/2017 | Bergh et al. |
| 2017/0008122 A1 | 1/2017 | Wieland et al. |
| 2017/0011914 A1 | 1/2017 | Sumant et al. |
| 2017/0029957 A1 | 2/2017 | Moon et al. |
| 2017/0036419 A1 | 2/2017 | Adib et al. |
| 2017/0103249 A1 | 4/2017 | Jin et al. |
| 2017/0119891 A1 | 5/2017 | Lal et al. |
| 2017/0160077 A1 | 6/2017 | Featherstone et al. |
| 2017/0169847 A1 | 6/2017 | Tamaki |
| 2017/0228884 A1 | 8/2017 | Yoshida |
| 2017/0252859 A1 | 9/2017 | Kumkar et al. |
| 2017/0276951 A1 | 9/2017 | Kumkar et al. |
| 2017/0352553 A1* | 12/2017 | Bellman ........... H01L 23/49827 |
| 2017/0358447 A1 | 12/2017 | Tsunetomo et al. |
| 2017/0363417 A1 | 12/2017 | Cui et al. |
| 2017/0372899 A1 | 12/2017 | Yang et al. |
| 2018/0005922 A1 | 1/2018 | Levesque et al. |
| 2018/0033128 A1 | 2/2018 | Sobieranski et al. |
| 2018/0044223 A1* | 2/2018 | Hayashi ................. C03C 3/097 |
| 2018/0057390 A1 | 3/2018 | Hackert et al. |
| 2018/0062342 A1 | 3/2018 | Comstock, II et al. |
| 2018/0068868 A1 | 3/2018 | Jaramillo et al. |
| 2018/0093914 A1 | 4/2018 | Akarapu et al. |
| 2018/0215647 A1 | 8/2018 | Ortner et al. |
| 2018/0340262 A1 | 11/2018 | Hiranuma |
| 2018/0342450 A1 | 11/2018 | Huang et al. |
| 2018/0342451 A1 | 11/2018 | Dahlberg et al. |
| 2019/0012514 A1 | 1/2019 | Jin et al. |

(56) References Cited

U.S. PATENT DOCUMENTS

| | | | |
|---|---|---|---|
| 2019/0185373 | A1 | 6/2019 | Hu et al. |
| 2020/0156990 | A1 | 5/2020 | Sakade et al. |

FOREIGN PATENT DOCUMENTS

| | | | |
|---|---|---|---|
| CA | 2530607 | A1 | 4/2005 |
| CN | 1096936 | A | 1/1995 |
| CN | 1196562 | A | 10/1998 |
| CN | 2388062 | Y | 7/2000 |
| CN | 1473087 | A | 2/2004 |
| CN | 1485812 | A | 3/2004 |
| CN | 1200793 | C | 5/2005 |
| CN | 1619778 | A | 5/2005 |
| CN | 1636912 | A | 7/2005 |
| CN | 1735568 | A | 2/2006 |
| CN | 1761378 | A | 4/2006 |
| CN | 1845812 | A | 10/2006 |
| CN | 1283409 | C | 11/2006 |
| CN | 1967815 | A | 5/2007 |
| CN | 101048255 | A | 10/2007 |
| CN | 101238572 | A | 8/2008 |
| CN | 101386466 | A | 3/2009 |
| CN | 101427427 | A | 5/2009 |
| CN | 100494879 | C | 6/2009 |
| CN | 101502914 | A | 8/2009 |
| CN | 100546004 | C | 9/2009 |
| CN | 100555601 | C | 10/2009 |
| CN | 101602148 | A | 12/2009 |
| CN | 101610870 | A | 12/2009 |
| CN | 201357287 | Y | 12/2009 |
| CN | 101631739 | A | 1/2010 |
| CN | 101637849 | A | 2/2010 |
| CN | 201471092 | U | 5/2010 |
| CN | 101722367 | A | 6/2010 |
| CN | 101862907 | A | 10/2010 |
| CN | 101965242 | A | 2/2011 |
| CN | 102046545 | A | 5/2011 |
| CN | 102060437 | A | 5/2011 |
| CN | 102246292 | A | 11/2011 |
| CN | 102300820 | A | 12/2011 |
| CN | 102304323 | A | 1/2012 |
| CN | 102319960 | A | 1/2012 |
| CN | 102326232 | A | 1/2012 |
| CN | 102343631 | A | 2/2012 |
| CN | 102356049 | A | 2/2012 |
| CN | 102356050 | A | 2/2012 |
| CN | 102428047 | A | 4/2012 |
| CN | 102485405 | A | 6/2012 |
| CN | 102540474 | A | 7/2012 |
| CN | 102574246 | A | 7/2012 |
| CN | 102585696 | A | 7/2012 |
| CN | 102596830 | A | 7/2012 |
| CN | 102649199 | A | 8/2012 |
| CN | 102672355 | A | 9/2012 |
| CN | 102795596 | A | 11/2012 |
| CN | 102898014 | A | 1/2013 |
| CN | 102916081 | A | 2/2013 |
| CN | 102923939 | A | 2/2013 |
| CN | 102958642 | A | 3/2013 |
| CN | 103013374 | A | 4/2013 |
| CN | 103079747 | A | 5/2013 |
| CN | 103143841 | A | 6/2013 |
| CN | 103159401 | A | 6/2013 |
| CN | 203021443 | U | 6/2013 |
| CN | 103237771 | A | 8/2013 |
| CN | 103273195 | A | 9/2013 |
| CN | 103316990 | A | 9/2013 |
| CN | 103347830 | A | 10/2013 |
| CN | 103359947 | A | 10/2013 |
| CN | 103359948 | A | 10/2013 |
| CN | 103460368 | A | 12/2013 |
| CN | 103531414 | A | 1/2014 |
| CN | 103534216 | A | 1/2014 |
| CN | 103746027 | A | 4/2014 |
| CN | 203509350 | U | 4/2014 |
| CN | 104334507 | A | 2/2015 |
| CN | 104344202 | A | 2/2015 |
| CN | 104620378 | A | 5/2015 |
| CN | 104897062 | A | 9/2015 |
| CN | 105228788 | A | 1/2016 |
| CN | 105246850 | A | 1/2016 |
| CN | 105392593 | A | 3/2016 |
| CN | 105693102 | A | 6/2016 |
| CN | 105859127 | A | 8/2016 |
| CN | 106029286 | A | 10/2016 |
| CN | 106132627 | A | 11/2016 |
| CN | 107108334 | A | 8/2017 |
| CN | 107108338 | A | 8/2017 |
| CN | 108191258 | A | 6/2018 |
| DE | 2231330 | A1 | 1/1974 |
| DE | 10322376 | A1 | 12/2004 |
| DE | 102006035555 | A1 | 1/2008 |
| DE | 102010003817 | A1 | 10/2011 |
| DE | 102011000768 | A1 | 8/2012 |
| DE | 102012010635 | A1 | 11/2013 |
| DE | 102012110971 | A1 | 5/2014 |
| DE | 102013103370 | A1 | 10/2014 |
| DE | 102013223637 | A1 | 5/2015 |
| DE | 102014113339 | A1 | 3/2016 |
| EP | 0247993 | A1 | 12/1987 |
| EP | 0270897 | A1 | 6/1988 |
| EP | 0280918 | A2 | 9/1988 |
| EP | 0393381 | A2 | 10/1990 |
| EP | 0938946 | A1 | 9/1999 |
| EP | 1043110 | A2 | 10/2000 |
| EP | 1159104 | A1 | 12/2001 |
| EP | 1164113 | A1 | 12/2001 |
| EP | 1412131 | A1 | 4/2004 |
| EP | 1449810 | A2 | 8/2004 |
| EP | 1609559 | A1 | 12/2005 |
| EP | 1614665 | A1 | 1/2006 |
| EP | 1651943 | A2 | 5/2006 |
| EP | 1714730 | A1 | 10/2006 |
| EP | 1990125 | A1 | 11/2008 |
| EP | 2020273 | A1 | 2/2009 |
| EP | 2133170 | A1 | 12/2009 |
| EP | 2202545 | A1 | 6/2010 |
| EP | 2253414 | A1 | 11/2010 |
| EP | 2398746 | A1 | 12/2011 |
| EP | 2543065 | A1 | 1/2013 |
| EP | 2574983 | A1 | 4/2013 |
| EP | 2600397 | A1 | 6/2013 |
| EP | 2754524 | A1 | 7/2014 |
| EP | 2781296 | A1 | 9/2014 |
| EP | 2783784 | A2 | 10/2014 |
| EP | 2831913 | A1 | 2/2015 |
| EP | 2859984 | A2 | 4/2015 |
| EP | 2922793 | A1 | 9/2015 |
| EP | 3166372 | A1 | 5/2017 |
| EP | 3288906 | A1 | 3/2018 |
| FR | 2989294 | A1 | 10/2013 |
| GB | 1242172 | A | 8/1971 |
| GB | 2481190 | A | 12/2011 |
| IN | 201102390 | | 3/2013 |
| JP | 55-130839 | A | 10/1980 |
| JP | 56-129261 | A | 10/1981 |
| JP | 56-160893 | A | 12/1981 |
| JP | 60-220340 | A | 11/1985 |
| JP | 64-077001 | A | 3/1989 |
| JP | 01-179770 | A | 7/1989 |
| JP | 03-252384 | A | 11/1991 |
| JP | 04-349132 | A | 12/1992 |
| JP | 06-079486 | A | 3/1994 |
| JP | 06-318756 | A | 11/1994 |
| JP | 09-106243 | A | 4/1997 |
| JP | 10-263873 | A | 10/1998 |
| JP | 11-197498 | A | 7/1999 |
| JP | 11-269683 | A | 10/1999 |
| JP | 11-297703 | A | 10/1999 |
| JP | 11-330597 | A | 11/1999 |
| JP | 11-347758 | A | 12/1999 |
| JP | 2000-010289 | A | 1/2000 |
| JP | 2000-301372 | A | 10/2000 |
| JP | 2000-302488 | A | 10/2000 |

(56) References Cited

FOREIGN PATENT DOCUMENTS

| | | |
|---|---|---|
| JP | 2001-105398 A | 4/2001 |
| JP | 2001106545 A | 4/2001 |
| JP | 2001-138083 A | 5/2001 |
| JP | 2002-028799 A | 1/2002 |
| JP | 2002-154846 A | 5/2002 |
| JP | 2002-210730 A | 7/2002 |
| JP | 2002-228818 A | 8/2002 |
| JP | 2003-017503 A | 1/2003 |
| JP | 2003-062756 A | 3/2003 |
| JP | 2003-114400 A | 4/2003 |
| JP | 2003-148931 A | 5/2003 |
| JP | 2003-154517 A | 5/2003 |
| JP | 2003-181668 A | 7/2003 |
| JP | 2003-238178 A | 8/2003 |
| JP | 2004-190043 A | 7/2004 |
| JP | 2004-209675 A | 7/2004 |
| JP | 2004-255562 A | 9/2004 |
| JP | 2004-330236 A | 11/2004 |
| JP | 2004-351494 A | 12/2004 |
| JP | 2004-363212 A | 12/2004 |
| JP | 2005-000952 A | 1/2005 |
| JP | 2005019576 A | 1/2005 |
| JP | 2005-074663 A | 3/2005 |
| JP | 2005-104819 A | 4/2005 |
| JP | 2005-205440 A | 8/2005 |
| JP | 2005-257339 A | 9/2005 |
| JP | 2005-279755 A | 10/2005 |
| JP | 2005-288503 A | 10/2005 |
| JP | 2005-306702 A | 11/2005 |
| JP | 2006-130691 A | 5/2006 |
| JP | 3775250 B2 | 5/2006 |
| JP | 3775410 B2 | 5/2006 |
| JP | 2006-161124 A | 6/2006 |
| JP | 2006-248885 A | 9/2006 |
| JP | 3823108 B2 | 9/2006 |
| JP | 2006-290630 A | 10/2006 |
| JP | 2007-021548 A | 2/2007 |
| JP | 2007-042741 A | 2/2007 |
| JP | 2007-067031 A | 3/2007 |
| JP | 2007-196277 A | 8/2007 |
| JP | 2007-253203 A | 10/2007 |
| JP | 2007-260896 A | 10/2007 |
| JP | 2008-094641 A | 4/2008 |
| JP | 2008-156200 A | 7/2008 |
| JP | 2008-522950 A | 7/2008 |
| JP | 2008-247639 A | 10/2008 |
| JP | 2008-273783 A | 11/2008 |
| JP | 2008-288577 A | 11/2008 |
| JP | 4349132 B2 | 10/2009 |
| JP | 4418282 B2 | 2/2010 |
| JP | 2010-046761 A | 3/2010 |
| JP | 2010-074017 A | 4/2010 |
| JP | 2010-539288 A | 12/2010 |
| JP | 4592855 B2 | 12/2010 |
| JP | 2011-011212 A | 1/2011 |
| JP | 2011-037707 A | 2/2011 |
| JP | 2011-049398 A | 3/2011 |
| JP | 4672689 B2 | 4/2011 |
| JP | 2011-517299 A | 6/2011 |
| JP | 2011-143434 A | 7/2011 |
| JP | 2011-178642 A | 9/2011 |
| JP | 2011-228517 A | 11/2011 |
| JP | 2011-251872 A | 12/2011 |
| JP | 2012-024782 A | 2/2012 |
| JP | 2012-028533 A | 2/2012 |
| JP | 2012-031018 A | 2/2012 |
| JP | 4880820 B2 | 2/2012 |
| JP | 2012-506837 | 3/2012 |
| JP | 2012-159749 A | 8/2012 |
| JP | 2012-517957 A | 8/2012 |
| JP | 2012-187618 A | 10/2012 |
| JP | 2013-007842 A | 1/2013 |
| JP | 2013-031879 A | 2/2013 |
| JP | 2013-043808 A | 3/2013 |
| JP | 2013-075802 A | 4/2013 |
| JP | 2013-091578 A | 5/2013 |
| JP | 2013-121908 A | 6/2013 |
| JP | 5274085 B2 | 8/2013 |
| JP | 2013-178371 A | 9/2013 |
| JP | 2013-187247 A | 9/2013 |
| JP | 2013-536081 A | 9/2013 |
| JP | 5300544 B2 | 9/2013 |
| JP | 2013-203630 A | 10/2013 |
| JP | 2013-203631 A | 10/2013 |
| JP | 2013-220958 A | 10/2013 |
| JP | 2013-223886 A | 10/2013 |
| JP | 5318748 B2 | 10/2013 |
| JP | 2013-245153 A | 12/2013 |
| JP | 2015-501531 A | 1/2015 |
| JP | 2015-030040 A | 2/2015 |
| JP | 2015-513804 A | 5/2015 |
| JP | 2015-129076 A | 7/2015 |
| JP | 2015-519722 A | 7/2015 |
| JP | 2015-146410 A | 8/2015 |
| JP | 2016-508069 A | 3/2016 |
| JP | 2018-518445 A | 7/2018 |
| KR | 10-2002-0038707 A | 5/2002 |
| KR | 10-2002-0066005 A | 8/2002 |
| KR | 10-2009-0057161 A | 6/2009 |
| KR | 2010-0120297 A | 11/2010 |
| KR | 10-1020621 B1 | 3/2011 |
| KR | 2011-0046953 A | 5/2011 |
| KR | 2011-0121637 A | 11/2011 |
| KR | 10-2012-0015366 A | 2/2012 |
| KR | 10-1120471 B1 | 3/2012 |
| KR | 10-1159697 B1 | 6/2012 |
| KR | 10-2012-0074508 A | 7/2012 |
| KR | 2012-0102675 A | 9/2012 |
| KR | 2013-0031380 A | 3/2013 |
| KR | 10-1259349 B1 | 4/2013 |
| KR | 10-1269474 B1 | 5/2013 |
| KR | 2013-0079395 A | 7/2013 |
| KR | 10-2013-0111269 A | 10/2013 |
| KR | 10-2013-0124646 A | 11/2013 |
| KR | 10-1344368 B1 | 12/2013 |
| KR | 10-2014-0022980 A | 2/2014 |
| KR | 10-2014-0022981 A | 2/2014 |
| KR | 10-2014-0064220 A | 5/2014 |
| KR | 10-1423338 B1 | 7/2014 |
| KR | 10-2014-0112652 A | 9/2014 |
| KR | 2015-0016176 A | 2/2015 |
| TW | 200842313 A | 11/2008 |
| TW | 201027601 A | 7/2010 |
| TW | 201041027 A | 11/2010 |
| TW | 201041118 A | 11/2010 |
| TW | 201212755 A | 3/2012 |
| TW | 201226345 A | 7/2012 |
| TW | 201303259 A | 1/2013 |
| TW | 201311592 A | 3/2013 |
| TW | 201331136 A | 8/2013 |
| TW | 201339111 A | 10/2013 |
| TW | 201429897 A | 8/2014 |
| TW | 201610602 A | 3/2016 |
| TW | 201621267 A | 6/2016 |
| TW | 201806082 A | 2/2018 |
| WO | 89/02877 A1 | 4/1989 |
| WO | 98/21154 A1 | 5/1998 |
| WO | 99/29243 A1 | 6/1999 |
| WO | 99/63900 A1 | 12/1999 |
| WO | 00/51778 A1 | 9/2000 |
| WO | 01/33621 A2 | 5/2001 |
| WO | 2002/081142 A1 | 10/2002 |
| WO | 2003/007370 A1 | 1/2003 |
| WO | 03/11522 A1 | 2/2003 |
| WO | 03/21004 A1 | 3/2003 |
| WO | 2004/110693 A1 | 12/2004 |
| WO | 2005/031300 A2 | 4/2005 |
| WO | 2005/033033 A1 | 4/2005 |
| WO | 2005/034594 A1 | 4/2005 |
| WO | 2006/073098 A1 | 7/2006 |
| WO | 2006/112822 A1 | 10/2006 |
| WO | 2007/094160 A1 | 8/2007 |
| WO | 2007/094233 A1 | 8/2007 |
| WO | 2007/096958 A1 | 8/2007 |

(56) References Cited

FOREIGN PATENT DOCUMENTS

| | | | |
|---|---|---|---|
| WO | 2008/012186 A1 | 1/2008 | |
| WO | 2008/080182 A1 | 7/2008 | |
| WO | 2008/102848 A1 | 8/2008 | |
| WO | 2008/110061 A1 | 9/2008 | |
| WO | 2008/128612 A1 | 10/2008 | |
| WO | 2009/072810 A2 | 6/2009 | |
| WO | 2009/114375 A2 | 9/2009 | |
| WO | 2010/035736 A1 | 4/2010 | |
| WO | 2010/087483 A1 | 8/2010 | |
| WO | 2010/096359 A1 | 8/2010 | |
| WO | 2010/111609 A2 | 9/2010 | |
| WO | 2010/129459 A2 | 11/2010 | |
| WO | 2011/025908 A1 | 3/2011 | |
| WO | 2011/056781 A1 | 5/2011 | |
| WO | 2011/109648 A1 | 9/2011 | |
| WO | 2012/006736 A2 | 1/2012 | |
| WO | 2012/011230 A1 | 1/2012 | |
| WO | 2012/027220 A2 | 3/2012 | |
| WO | 2012/060277 A1 | 5/2012 | |
| WO | 2012/075072 A2 | 6/2012 | |
| WO | 2012/108052 A1 | 8/2012 | |
| WO | 2012/161317 A1 | 11/2012 | |
| WO | 2012/166753 A1 | 12/2012 | |
| WO | 2013/008344 A1 | 1/2013 | |
| WO | 2013/016157 A1 | 1/2013 | |
| WO | 2013/022148 A1 | 2/2013 | |
| WO | 2013/030848 A1 | 3/2013 | |
| WO | 2013/043173 A1 | 3/2013 | |
| WO | 2013/084877 A1 | 6/2013 | |
| WO | 2013/084879 A1 | 6/2013 | |
| WO | 2013/130718 A1 | 9/2013 | |
| WO | 2013/134237 A1 | 9/2013 | |
| WO | 2013/138802 A1 | 9/2013 | |
| WO | 2013/147694 A1 | 10/2013 | |
| WO | 2013/150990 A1 | 10/2013 | |
| WO | 2013/153195 A1 | 10/2013 | |
| WO | 2014/010490 A1 | 1/2014 | |
| WO | 2014/012125 A1 | 1/2014 | |
| WO | 2014/028022 A1 | 2/2014 | |
| WO | 2014/038326 A1 | 3/2014 | |
| WO | 2014/064492 A1 | 5/2014 | |
| WO | 2014/079478 A1 | 5/2014 | |
| WO | 2014/079570 A1 | 5/2014 | |
| WO | 2014/085660 A1 | 6/2014 | |
| WO | 2014/085663 A1 | 6/2014 | |
| WO | 2014/111385 A1 | 7/2014 | |
| WO | 2014/111794 A1 | 7/2014 | |
| WO | 2014/121261 A1 | 8/2014 | |
| WO | 2014/148020 A1 | 9/2014 | |
| WO | 2014/161535 A2 | 10/2014 | |
| WO | 2014/161534 A3 | 11/2014 | |
| WO | 2014/205301 A2 | 12/2014 | |
| WO | 2015/029286 A1 | 3/2015 | |
| WO | 2015/077113 A1 | 5/2015 | |
| WO | 2015/094898 A2 | 6/2015 | |
| WO | 2015/095088 A1 | 6/2015 | |
| WO | 2015/095090 A1 | 6/2015 | |
| WO | 2015/095146 A1 | 6/2015 | |
| WO | 2015/095151 A2 | 6/2015 | |
| WO | 2015100056 A1 | 7/2015 | |
| WO | 2015113023 A1 | 7/2015 | |
| WO | 2015/127583 A1 | 9/2015 | |
| WO | 2015157202 A1 | 10/2015 | |
| WO | 2016/005455 A1 | 1/2016 | |
| WO | 2016/010954 A2 | 1/2016 | |
| WO | 2016069821 A1 | 5/2016 | |
| WO | 2016/089844 A1 | 6/2016 | |
| WO | 2016/118683 A1 | 7/2016 | |
| WO | 2016/154284 A1 | 9/2016 | |
| WO | WO-2016143665 A1 * | 9/2016 | ........... C03B 17/064 |
| WO | 2016/178966 A1 | 11/2016 | |
| WO | 2016176171 A1 | 11/2016 | |
| WO | 2016/201027 A2 | 12/2016 | |
| WO | 2017/038075 A1 | 3/2017 | |
| WO | 2017/062798 A1 | 4/2017 | |
| WO | 2017127489 A1 | 7/2017 | |
| WO | 2017210376 A1 | 12/2017 | |
| WO | 2018/162385 A1 | 9/2018 | |

OTHER PUBLICATIONS

Koyama et al. "Laser-micromachining for Ag Ion Exchanged Glasses," Second International Symposium on Laser Precision Microfabrication, Proc. SPE vol. 4426 (2002) 162-165.

Kruger et al. "UV laser drilling of SiC for semiconductor device fabrication," J. Physics:Conference Series 59 (2007) 740-744.

Kruger et al., "Femtosecond-pulse visible laser processing of transparent materials"; Applied Surface Science 96-98 (1996) 430-438.

Kruger et al., "Laser micromachining of barium aluminium borosilicate glass with pluse durations between 20 fs anc 3 ps"; Applied Surface Science 127-129 (1998) 892-898.

Kruger et al., "Structuring of dielectric and metallic materials with ultrashort laser pulses between 20 fs and 3 ps"; SPIE vol. 2991, 0277-786X/97, pp. 40-47, (1997).

Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/S003399900300.

Levy et al. "Design, fabrication, and characterization of circular Dammann gratings based on grayscale lithography," Opt. Lett vol. 35, No. 6, p. 880-882 (2010).

Li et al. "Thick Polymer cover layers for laser micromachining of fine holes," Applied Physics A, Sep. 2005, vol. 81, Issues 4, pp. 753-758.

Liu X et al. "laser ablation and micromachining with ultrashort laser pulses", IEEE J. Quantum Electronics, 22, 1706-1716, 1997.

Madehow.com, Liquid Crystal Display (LCD), Jan. 29, 2006, https://fweb.archive.org/web/20060129092154/http://www.madehow.com/Volume-1/Liquid-Crystal-Display-LCD.html pp. 1-6.

Maeda et al. "Optical performance of angle-dependent light-control glass", Proc. SPIE 1536, Optical Materials Technology for Energy Efficiency and Solar Energy Conversion X, 138 (Dec. 1, 1991).

Matsusaka et al. "Micro-machinability of silversodium ion-exchanged glass by UV nanosecond laser," J. Materials Processing Technology 202 (2008) 514-520.

Mbise et al. "Angular selective window coatings: theory and experiments" J. Phys. D: Appl. Phys. 30 2103 (1997).

Mcgloin et al. "Bessel beams: diffraction in a new light" Contemporary Physics, vol. 46 No. 1 (2005) pp. 15-28.

Merola et al. "Characterization of Bessel beams generated by polymeric microaxicons" Meas. Sci. Technol. 23 (2012) 10 pgs.

Microchemicals, "Silicon Wafers, Quartz Wafers, Glass Wafers," Product Specifications: Brochure. 2014, 28 pgs.

Miranda et al. (Ultraviolet-induced crosslinking of poly(vinyl alcohol) evaluated by principal component analysis of FTIR spectra; Polym Int 50:1068-1072(2001).

Mirkhalaf, M. et al., Overcoming the brittleness of glass through bio-inspiration and micro-achitecture, Nature Communications, 5:3166/ncomm4166(2014).

Mukhina L.; "Laser Pulse Damage on the Surface of Ion Exchange Treated Glass"; Soviet Journal of Glass Physics and Chemistry; vol. 19; No. 3; pp. 269-272; (1993).

Ogutu et al; "Superconformal Filling of High Aspect Ratio Through Glass Vias (TGV) for Interposer Applications Using TNBT and NTBC Additives"; Journal of the Electrochemical Society, 162 (9), D457-D464 (2015).

Perry et al., "Ultrashort-pulse laser machining of dielectric materials"; Journal of Applied Physics, vol. 85, No. 9, May 1, 1999, American Institute of Physics, pp. 6803-6810.

Perry et al., "Ultrashort-pulse laser machining"; UCRL-JC-132159 Rev 1., Jan. 22, 1999, pp. 1-24.

Polavka et al. "Crosslinking of polymers by the effect of ultraviolet radiation crosslinking of poly(vinyl alcohol) in the presence oflerephtalic aldehyde"; 1980.

Polynkin et al., Extended filamentation with temporally chirped femtosecond Bessel-Gauss beams in air; Optics Express, vol. 17, No. 2, Jan. 19, 2009, OSA, pp. 575-584.

(56) References Cited

OTHER PUBLICATIONS

Ramil et al. "Micromachining of glass by the third harmonic of nanosecond Nd:YV04 laser", Applied Surface Science 255 (2009) p. 5557-5560.
Romero et al. "Theory of optimal beam splitting by phase gratings. II. Square and hexagonal gratings" J. Opt. Soc. Am. AA/ol 24 No. 8 (2007) pp. 2296-2312.
Salleo A et al., Machining of transparent materials using IR and UV nanosecond laser pulses, Appl. Physics A 71, 601-608,2000.
Serafetinides et al., "Polymer ablation by ultra-short pulsed lasers" Proceedings of SPIE vol. 3885 (2000) http://proceedings. spiedigital-library.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi: 10.1117/1.1617311.
Shorey et al; "Progress and Application of Through Glass Via (TGV) Technology"; 2016 Pan Pacific Microelectron is Symposium, SMTA, Jan. 25, 2016; pp. 1-6.
Shorey; "Leveraging Glass for Advanced Packaging and IoT"; Apr. 21, 2016, Retrieved Formthe Internet: URL:http://www.corning.com/media/worldwide/cdt/documents/iMAPs%20-%20Corning%20Overview%20-%204-21-16%20FINALpptx.pdf.
Siegman; "New Development in Laser Resonators"; SPIE, vol. 1227, Optical Resonators (1990) pp. 2-14.
Stoian et al. "Spatial and temporal laser pulse design for material processing on ultrafast scales" Applied Physics A (2014)114, p. 119-127.
Sundaram et al., "Inducing and probing non-thermal transitions in semiconductors using femtosecond laser pulses" Nature Miracles, vol. 1, Dec. 2002, Nature Publishing Group (2002), pp. 217-224.
Swift Glass, Quartz/Fused Silica, Mar. 2016 (Year: 2016).
Thiele; Relation Between Catalytic Activity and Size of Particle;; Industrial and Engineering Chemistry, vol. 31, No. 7; (1939) pp. 916-920.
Tom Christiansen, Tami Erickson; Standard Operating Procedure: Spin-On-Glass, Surface Level Characterization (2000).
Topper et al; "3-D Thin Film Interposer Based on TGV (Through Glass Vias): An Alternative to Si-Interposer"; IEEE, Electronic Components and Technology Conference; 2010; pp. 66-73.
Toytman et al. "Optical breakdown in transparent media with adjustable axial length and location", Optics Express vol. 18 No. 24, 24688-24698 (2010).
Tsai et al. "Investigation of underwater laser drilling for brittle substrates," J. Materials Processing technology 209 (2009) 2838-2846.
U.S. Appl. No. 62/846,059; Cai et al. "Silicate Glass Compositions Useful for the Efficient Production of Through Glass Vias", filed May 10, 2019, 43 pgs.
U.S. Appl. No. 62/846,102; Guo et al. "High Silicate Glass Articles Possessing Through Glass Vias and Methods of Making and Using Thereof", filed May 10, 2019, 36 pgs.
Uzgiris et al. "Etched Laser Filament Tracks in Glasses and Polymers", (1973) Phys. Rev. A 7, 734-740.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashod laser pulses"; Applied Physics A 65, 367-373, Springer-Verlag (1997).
Velpula et al.. "Ultrafast imaging of free carriers: controlled excitation with chirped ultrafast laser Bessel beams", Proc. ofSPIEvol. 8967 896711-1 (2014).
Wakayama et al. "Small size probe for inner profile measurement of pipes using optical fiber ring beam device" Proc, of SPIE vol. 8563, 2012. 7 pgs.

Wang et al, "Investigation on C02 laser irradiation inducing glass strip peeling for microchannel formation", Biomicrofluidics 6, 012820 (2012).
Wlodarczyk et al. "The Impact of Graphite Coating and Wavelength on Picosecond Laser Machining of Optical Glasses,", 31st ICALEO Program Notes (2012). Paper M#309.
Wu et al, "A Study On Annealing Mechanisms With Different Manganese Contents in CuMn Alloy"; Journal of Alloys and Compounds, vol. 542, 2012, pp. 118-123.
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yun et al; "P-23:The Contact Properties and TFT Structures of A-IGZO TFTs Combined With Cu—Mn Alloy Electrodes; SID Symposium Digest of Technical Papers 42:1, 1177-1180", (2011).
Zavyalov, "3D Hole Inspection Using Lens with High Field Curvature" Measurement Science Review, V. 15, No. 1, 2015. pp 52-57.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 100423X796/05050354-11, pp. 354-364.
Pie Scientific, Photoresist stripping and descum organic contamination removal for silicon wafer, Feb. 2016 (Year: 2016).
West et al., Optimisation of photoresist removal from silicon wafers using atmosphericpressure plasma jet effluent, Jul. 2015, 22nd International Symposium on Plasma Chemistry (Year: 2015).
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 11, Aug. 2011.
"What is the difference between Ra and RMS?"; Harrison Electropolishing LP; (http://www.harrisonep.com/electropolishingra.html), Accessed Aug. 8, 2016.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Processing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
ASTM standard C770-16, entitled "Standard Test Method for Measurement of Glass Stress—Optical Coefficient,".
Bagchi et al. "Fast ion beams from intense, femtosecond laser irradiated nanostructured surfaces" Applied Physics B 88 (2007) p. 167-173.
Benjamin et al; "The Adhesion of Evaporated Metal Films on Glass"; Proc. Roy. Soc. A., vol. 261, (1962); pp. 516-531.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. of SPIE vol. 7728 77281V-1, 2010.
Bhuyan et al., "Femtosecond non-diffracting Bessel beams and controlled nanoscale ablation" by IEEE (2011).

(56) References Cited

OTHER PUBLICATIONS

Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Borghi et al; "M2 Factor of Bessel-Gauss Beams"; Optics Letters; vol. 22, No. 5; (1997) pp. 262-264.
Case Design Guidelines for Apple Devices Release R5 (https://web.archive.Org/web/20131006050442/https://developer.apple.com/resources/cases/Case-Design-Guidelines.>df; archived on Oct. 6, 2013).
Chen et al. "Development of an AOI system for chips with a hole on backside based on a frame imager" Proc. of SPIE vol. 9903, 2016, 6 pgs.
Chen et al. "Projection ablation of glass-based single and arrayed microstructures using excimer laser", (2005) Optics and Laser Technology 37, 271-280.
Chiao etal. 9. "Self-trapping of optical beams," Phys. Rev. Lett, vol. 13, No. 15, p. 479 (1964).
Coming Inc., "Corning(Registered) 1737 Am LCD Glass Substrates Material Information", issued Aug. 2002.
Coming Inc., "Corning(Registered) Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance" Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Dumin. "Exact solutions for nondiffracting beams I. The scaler theory" J. Opt. Soc. Am. A. 4(4) pp. 651-654, (1987).
Duocastella et al. "Bessel and annular beams for material processing", Laser Photonics Rev. 6, 607-621, 2012.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Handbook of Adhesives (3rd edition, Edited by Irving Skeist), (1977).
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Iijima et al; "Resistivity Reduction By External Oxidation of Cu—Mn Alloy Films for Semiconductor Interconnect Application"; Journal of Vacuum Science & Technology B: Microelectronics and Nanometer Structures Processing, Measurement, and Phenomena, 27, 1963-1968 (2009).
Intergrace, "Borosilicate glass: technical glass by Pulles & Hanique: Duan & Pyrex," Pulles & Hanique B.V., 2 pgs. Published Mar. 15, 2012, retrieved from: https://web.archive.org/web/20120315092729/http://www.pulleshanique.com/02_borosilicate-glass.htm.
Jaramillo et al., Wet etching of hydrogenated amorphous carbon films, Mar. 7, 2001, Diamond and Related Materials, vol. 10, Issues 3-7, pp. 976-979 (Year: 2001).
Juodkazis S. et al. Laser induced microexplosion confined in the bulk of a sapphire crystal: evidence of multimegabar pressures., Phys. Rev. Lett. 96, 166101,2006.
Karlsson et al. "The technology of chemical glass strengthening—a review" Glass Technol: Eur. J. Glass Sci. Technol. A (2010) 51 (2) pp. 41-54.
Kiyama et al; "Examination of Etching Agent and Etching Mechanism on Femtosecond Laser Microfabrication of Channels Inside Vitreous Silica Substrates"; J. Phys. Chem. C, 2009, 113, pp. 11560-11566.
International Search Report and Written Opinion PCT/US2019/019120 dated May 29, 2019, 11 pgs.
Smedskjaer et al; "Impact of ZnO on the Structure and Properties of Sodium Aluminosilicate Glasses: Comparison With Alkaline Earth Oxides," Journal of Non-Crystalline Solids 381, 58-64 (2013).
Chinese Patent Application No. 201980014910.6, Office Action, dated May 5, 2022, 15 pages (8 pages of English Translation and 7 pages of Original Document), Chinese Patent Office.

* cited by examiner

---

ALKALI-FREE BOROSILICATE GLASSES WITH LOW POST-HF ETCH ROUGHNESS

This application claims the benefit of priority to U.S. Provisional Application Ser. No. 62/633,835 filed on Feb. 22, 2018, the content of which is relied upon and incorporated herein by reference in its entirety.

BACKGROUND

Field

The present disclosure generally relates to articles and methods of forming vias in substrates. In particular, the present disclosure is directed to articles and methods of forming through vias in substrates that include etching processes that preserve the surface roughness (Ra) of a substrate.

Technical Background

Glass substrates with vias are desirable for many applications, including for use as an interposer used as an electrical interface. Glass interposers have become an attractive alternative to silicon and fiber reinforced polymers. But, some of the processes used in producing glass substrates with vias lead to undesirable surface roughness.

Accordingly, a need exists for methods for forming vias in substrates while preserving low surface roughnesses (Ra).

SUMMARY

In a first embodiment, an article comprises a glass substrate. The glass substrate has a first surface having a plurality of vias therein, and a second surface parallel to the first surface. At least one of the first surface and the second surface is an etched surface having a surface roughness (Ra) of 0.75 nm or less. The glass substrate comprises, in mol percent on an oxide basis:
 65 mol % $\leq SiO_2 \leq$ 75 mol %;
 7 mol % $\leq Al_2O_3 \leq$ 15 mol %;
 0.1 mol % $\leq B_2O_3 \leq$ 2 mol %;
 wherein:
 RO=MgO+CaO+SrO+BaO+ZnO;
 $R_2O = Li_2O + Na_2O + K_2O + Rb_2O + Cs_2O$
 26.25 mol % $\leq RO + Al_2O_3 - B_2O_3$;
 0 mol % $\leq R_2O \leq$ 2 mol %; and
 $SiO_2$, $Al_2O_3$, $B_2O_3$, MgO, ZnO, CaO, SrO, BaO, $R_2O$, and RO represent the mol percents of the representative oxide components.

In a second embodiment, the glass substrate comprises, in mol percent on an oxide basis:
 65 mol % $\leq SiO_2 \leq$ 75 mol %;
 7 mol % $\leq Al_2O_3 \leq$ 15 mol %;
 0.1 mol % $\leq B_2O_3 \leq$ 2 mol %;
 0 mol % $\leq P_2O_5 \leq$ 2 mol %;
 0 mol % $\leq$ MgO $\leq$ 6 mol %;
 0 mol % $\leq$ ZnO $\leq$ 4 mol %;
 0 mol % $\leq$ CaO $\leq$ 6 mol %;
 0 mol % $\leq Sr_O \leq$ 10 mol %;
 0 mol % $\leq$ BaO $\leq$ 10 mol %;
 0 mol % $\leq SnO_2 \leq$ 0.5 mol %;
 0 mol % $\leq As_2O_3 \leq$ 0.5 mol %;
 0 mol % $\leq Sb_2O_3 \leq$ 0.5 mol %;
 wherein:
 $P_2O_5$, $Na_2O$, $K_2O$, $SnO_2$, $As_2O_3$, $Sb_2O_3$, represent the mol percents of the representative oxide components.

In a third embodiment, for the article of any of the first through second embodiments, the article of the first embodiment is the glass substrate.

In a fourth embodiment, for the article of any of the first through third embodiments, the plurality of vias are through vias extending from the first surface to the second surface.

In a fifth embodiments, for the article of any of the first through third embodiments, the plurality of vias are blind vias extending from the first surface toward the second surface without reaching the second surface.

In a sixth embodiment, for the article of any of the first through fifth embodiments, the article further comprises a carrier. At least one of the first surface and the second surface is etched, has a surface roughness (Ra) of 0.75 nm or less and is bonded to the carrier.

In a seventh embodiment, for the article of the sixth embodiment, the carrier has a surface roughness (Ra) of 0.2 nm to 0.4 nm.

In an eighth embodiment, for the article of any of the first through seventh embodiments, the glass substrate has a post-etch thickness of 150 μm or less.

In a ninth embodiment, for the article of any of the first through eighth embodiments, the glass substrate has a thickness of 90 μm to 110 μm.

In a tenth embodiment, for the article of any of the first through ninth embodiments, 69 mol % $\leq SiO_2 \leq$ 72 mol %.

In eleventh through thirteenth embodiments, for the article of any of the first through tenth embodiments, 26.5 mol % $\leq RO + Al_2O_3 - B_2O_3$, or 26.75 mol % $\leq RO + Al_2O_3 - B_2O_3$, or 27.0 mol % $\leq RO + Al_2O_3 - B_2O_3$.

In a fourteenth and fifteenth embodiments, for the article of any of the first through thirteenth embodiments, 0 mol % $\leq R_2O \leq$ 1 mol %, or 0 mol % $\leq R_2O \leq$ 0.5 mol %.

In a sixteenth embodiment, a method comprises forming a plurality of vias in a glass substrate having a first surface and a second surface. The method includes etching at least one of the first surface and the second surface to form an etched surface. The glass substrate comprises, in mol percent on an oxide basis:
 65 mol % $\leq SiO_2 \leq$ 75 mol %
 7 mol % $\leq Al_2O_3 \leq$ 15 mol %;
 0.1 mol % $\leq B_2O_3 \leq$ 2 mol %;
 wherein:
 RO=MgO+CaO+SrO+BaO+ZnO;
 $R_2O = Li_2O + Na_2O + K_2O + Rb_2O + Cs_2O$
 26.25 mol % $\leq RO + Al_2O_3 - B_2O_3$;
 0 mol % $\leq R_2O \leq$ 2 mol %; and
 $SiO_2$, $Al_2O_3$, $B_2O_3$, MgO, ZnO, CaO, SrO, BaO, $R_2O$, and RO represent the mol percents of the representative oxide components.

In a seventeenth embodiment, the glass substrate comprises, in mol percent on an oxide basis:
 65 mol % $\leq SiO_2 \leq$ 75 mol %;
 7 mol % $\leq Al_2O_3 \leq$ 15 mol %;
 0.1 mol % $\leq B_2O_3 \leq$ 2 mol %;
 0 mol % $\leq P_2O_5 \leq$ 2 mol %;
 0 mol % $\leq$ MgO $\leq$ 6 mol %;
 0 mol % $\leq$ ZnO $\leq$ 4 mol %;
 0 mol % $\leq$ CaO $\leq$ 6 mol %;
 0 mol % $\leq Sr_O \leq$ 10 mol %;
 0 mol % $\leq$ BaO $\leq$ 10 mol %;
 0 mol % $\leq SnO_2 \leq$ 0.5 mol %;
 0 mol % $\leq As_2O_3 \leq$ 0.5 mol %;
 0 mol % $\leq Sb_2O_3 \leq$ 0.5 mol %;
 wherein
 $P_2O_5$, $Na_2O$, $K_2O$, $SnO_2$, $As_2O_3$, $Sb_2O_3$, represent the mol percents of the representative oxide components.

In an eighteenth embodiment, for the method of any of the sixteenth through seventeenth embodiments, the etched surface has a surface roughness (Ra) of 0.75 nm or less.

In a nineteenth embodiment, for the method of any of the sixteenth through eighteenth embodiments, the etching is performed with an etchant comprising hydrofluoric acid.

In a twentieth embodiment, for the method of any of the sixteenth through nineteenth embodiments, the method further comprises bonding one of the etch surfaces of the glass substrate to a carrier.

The limitations of the fourth through fifteenth embodiments may be combined with the embodiments of the sixteenth through twentieth embodiments in any permutation.

The embodiments set forth in the specification and drawings are illustrative and exemplary in nature, and are not intended to limit the subject matter defined by the claims.

DETAILED DESCRIPTION

Figure 1:
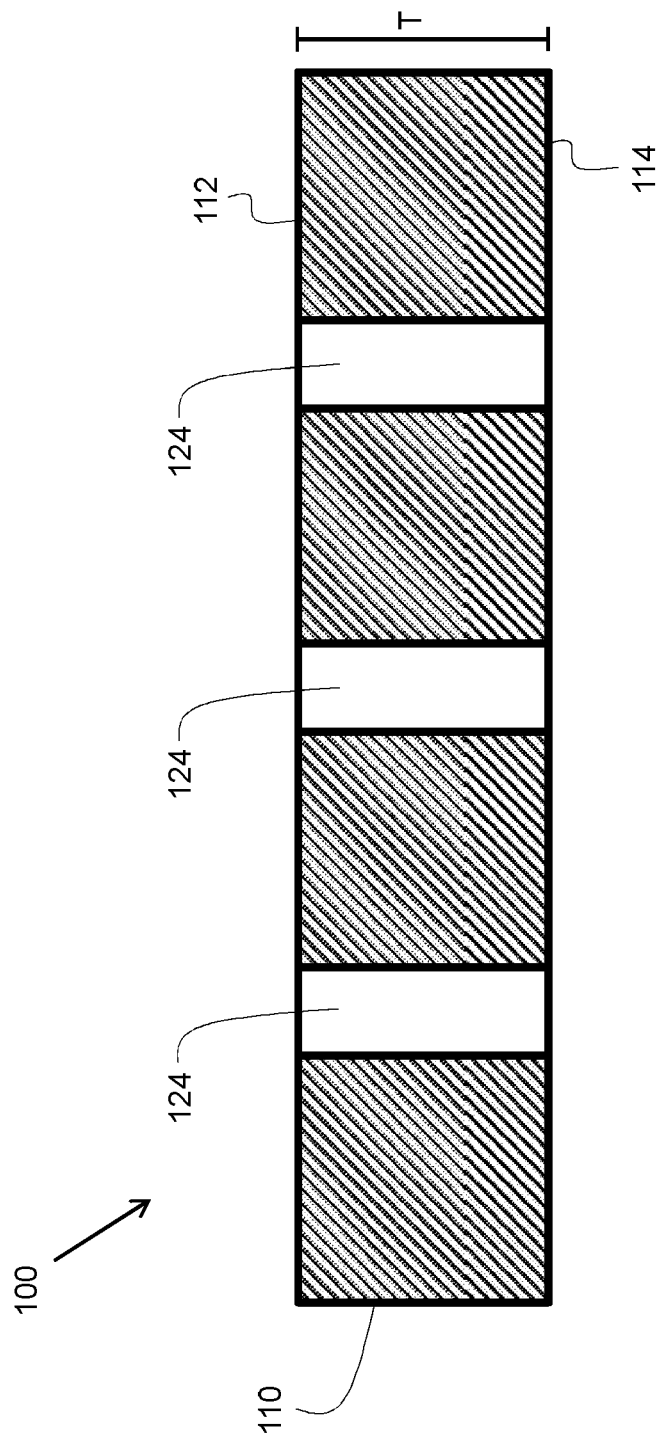
FIG. 1 shows a substrate with through vias.

Embodiments of articles and methods of creating vias in substrates described herein allow for the preservation of surface roughness (Ra) of substrates. This allows the substrates, for example, to be removably bonded to carriers for further processing using Van der Waals bonding, which works best with low surface roughness substrates. The embodiments and methods disclosed herein may be used in other contexts where a low surface roughness etches surface is desirable.

An interposer may be used as an electrical interface in an electronic device, including devices having a radio frequency (RF) filter, to spread an electrical connection to a wider pitch or to reroute an electrical connection to a different electrical connection. Glass interposers, i.e., a glass substrate having vias through which electrical connections may be made, have become an attractive alternative to silicon and fiber reinforced polymers. This is due, in part, to the ability of glass to be formed in large thin sheets. However, with continuously thinner electronic devices, many applications require interposers to the have thicknesses of 300 µm or less. Such thin glass can be difficult to handle in fabrication procedures because of the glass's fragility and lack of stiffness. To counteract a glass substrate's fragility and lack of stiffness, fabrication methods using a carrier to which the glass substrate is bonded are needed.

Van der Waals forces may be used to temporarily bond glass articles to carriers. The energy of the temporary bond is sufficient to survive flat panel fabrication, while remaining de-bondable. However, Van der Waals forces may produce weak bonds, if any, when the surface roughness (Ra) of the glass article is too high.

Typically, glass interposers require vias (holes) to be filled with electrically conductive material to provide electrical interfacing. A known method of creating vias in glass interposers is by creating a damage region through the thickness of the glass interposer and then submerging to substrate into an etchant. The etchant may then remove material from the damage region to enlarge the hole. However, the etching process may also remove material from both faces of the glass interposer as well as enlarging the hole. This etching may create a glass interposer surface roughness (Ra) outside of the range which Van der Waals bonds can be appropriately formed.

Glass compositions are disclosed herein which can be etched while preserving a low surface roughness suitable for Van der Waals bonding, and for other applications.

One way to reduce the post etch surface roughness of a glass substrate is to increase the alkali oxide ($R_2O$) content of the glass composition. But, alkali oxides are undesirable for certain applications. For example, a glass interposer having a glass composition that includes too much alkali oxide may detrimentally affect or "poison" some of the devices typically placed near the interposer. So, using alkali oxides to achieve lower post etch surface roughness is unsuitable for some applications.

Another way to reduce the post etch surface roughness of a glass substrate is to increase the $Al_2O_3$ content of the glass composition. But, too much alumina can have undesirable effects, such as a too-large increase in the liquidus temperature of the glass composition. Alkali oxides may be used to lower the liquidus temperature. But, alkali oxides are undesirable for some applications as described above.

It has been unexpectedly and surprisingly found that, for low alkali oxide glasses, a specific glass content of $SiO_2$, $Al_2O_3$, $B_2O_3$ and RO results in a low post etch surface roughness, where RO is the sum of the glass content of $MgO+CaO+SrO+BaO+ZnO$. In particular, the glass substrate comprises, in mol percent on an oxide basis:

65 mol % ≤ $SiO_2$ ≤ 75 mol %;
7 mol % ≤ $Al_2O_3$ ≤ 15 mol %;
0.1 mol % ≤ $B_2O_3$ ≤ 2 mol %;
wherein:
26.25 mol % ≤ $RO+Al_2O_3-B_2O_3$; and
0 mol % ≤ $R_2O$ ≤ 2 mol %.

In these compositions, the RO content of the glass helps to lower post etch surface roughness without the undesirable effects of too much $Al_2O_3$ or too much $R_2O$. By properly choosing the amounts of the glass components, a surprisingly low post etch surface roughness can be achieved for glass with a low alkali oxide content.

The articles disclosed herein may be used, for example, as an interposer in a semiconductor package, the articles having etched holes (e.g., vias) and surface attributes which allow for successful downstream processing including, but not limited to, via metallization and application of redistribution layers (RDL) for semiconductor devices, radio-frequency (RF) devices (e.g., antennae, switches, and the like), interposer devices, microelectronic devices, optoelectronic devices, microelectronic mechanical system (MEMS) devices and other applications where vias may be leveraged.

Substrates with Vias

FIG. 1 shows a cross section of an example article 100. Article 100 includes a substrate 110. Substrate 110 has a first surface 112 and a second surface 114, separated by a thickness T. A plurality of vias 124 extend from first surface 112 to second surface 114, i.e., vias 124 are through vias.

Figure 2:
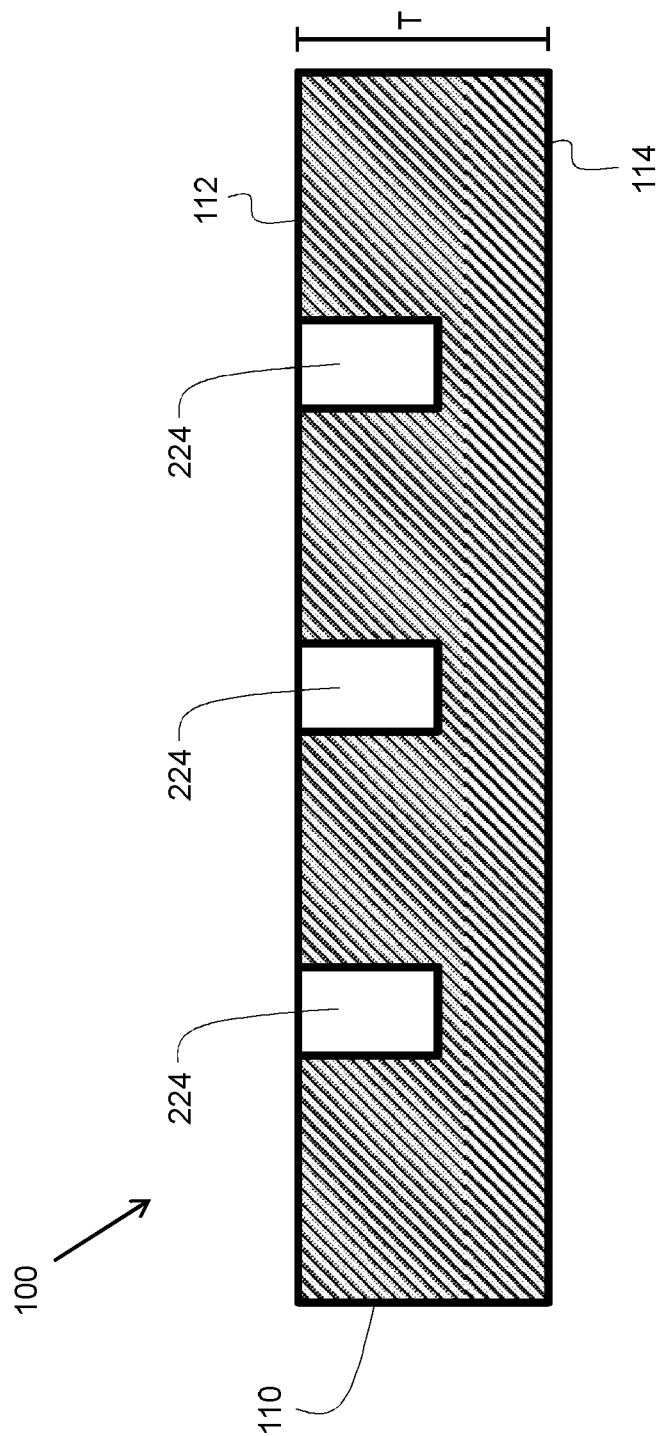
FIG. 2 shows a substrate with blind vias.

FIG. 2 shows a cross section of an example article 200. Article 200 includes a substrate 110. Substrate 110 has a first surface 112 and a second surface 114, separated by a thickness T. A plurality of vias 224 extend from first surface 112 towards second surface 114, without reaching second surface 114, i.e., vias 124 are blind vias.

A "via" as used herein refers to a hole or opening in a substrate. While FIGS. 1 and 2 show specific via configurations, various other via configurations may be used. By way of non-limiting example, vias having an hourglass shape, a barbell shape, beveled edges, or a variety of other geometries may be used instead of the cylindrical geometries shown in FIGS. 1 and 2. The via may be substantially cylindrical, for example having a waist (point along the via with the smallest diameter) with a diameter that is at least 70%, at least 75%, or at least 80% of the diameter of an opening of the via on the first or second surface. The via may extend all the way through the substrate, e.g. FIG. 1, or only partially through the substrate, e.g., FIG. 2. Other via geometries may be used.

For an application where low surface roughness is desired for removable bonding to a carrier, post-etch thickness T is typically in the range 50 μm to 250 μm. At higher thickness, substrate 110 may be sufficiently thick that a carrier is not needed. At lower thicknesses, substrate 110 may break in any event. Thickness T may be 150 μm or less, 100 μm, or 90 μm to 110 μm, which are thicknesses that balances the desire for thin devices against the desire for structural integrity and insulating properties. Thickness T may be 50 μm, 100 μm, 150 μm, 200 μm, 250 μm, or any range having any two of the preceding values as endpoints. Other thicknesses may be used as well. For example, there may be applications for the low surface roughness substrates described herein other than removable bonding to a carrier. So, thickness T may depend on the application and is not necessarily limited by this disclosure.

First surface 112 and second surface 114 have a pre-etch surface roughness (Ra). As used herein, "surface roughness" refers to arithmetic mean surface roughness. The literature often uses the notation "Ra" to arithmetic mean surface roughness. Surface roughness Ra is defined as the arithmetic average of the differences between the local surface heights and the average surface height, and can be described by the following equation:

$$R_a = \frac{1}{n}\sum_{i=1}^{n}|y_i|$$

where $y_i$ is the local surface height relative to the average surface height. Surface roughness (Ra) may be measured and/or calculated from measurements using a variety of techniques. Unless otherwise specified, surface roughness as described herein is measured using a Veeco Dimension Icon atomic force microscope (AFM) with the following parameters: 1 Hz, 512 scans/line, and 2 micron image size.

Glass Composition

The glass compositions described herein are alkali free borosilicate glasses that generally include a combination of $SiO_2$, $Al_2O_3$, and RO, where RO=MgO+CaO+SrO+BaO+ZnO. Alkali free means that the glasses include at most a small amount of alkali oxides ($R_2O$), where $R_2O$=$Li_2O$+$Na_2O$+$K_2O$+$Rb_2O$+$Cs_2O$. In addition, the glass compositions described herein meet the condition 26.25≤RO+$Al_2O_3$−$B_2O_3$. When etched with HF and similar etchants, the glass compositions exhibit a particularly low post-etch surface roughness for alkali free glass compositions.

In some embodiments, the glass compositions may include additional oxides such as $P_2O_5$, $B_2O_3$. These components may be added, for example, to modify the liquidus viscosity and/or improve the mechanical durability of the glass. In some embodiments the glass compositions may further include one or more additional oxides such as, for example, $SnO_2$, $As_2O_3$, $Sb_2O_3$ or the like, as described herein. These components may be added as fining agents.

Substrate 110 may be formed from various glass compositions. In a first embodiment, the glass substrate comprises, in mol percent on an oxide basis:

65 mol %≤$SiO_2$≤75 mol %;
7 mol %≤$Al_2O_3$≤15 mol %
0.1 mol %≤$B_2O_3$≤2 mol %;
0 mol %≤$P_2O_5$≤2 mol %;
0 mol %≤MgO≤6 mol %;
0 mol %≤ZnO≤4 mol %;
0 mol %≤CaO≤6 mol %;
0 mol %≤$Sr_{0≤10}$ mol %;
0 mol %≤BaO≤10 mol %;
0 mol %≤$SnO_2$≤0.5 mol %;
0 mol %≤$As_2O_3$≤0.5 mol %;
0 mol %≤$Sb_2O_3$≤0.5 mol %;
wherein:
RO=MgO+CaO+SrO+BaO+ZnO;
$R_2O$=$Li_2O$+$Na_2O$+$K_2O$+$Rb_2O$+$Cs_2O$
26.25 mol %≤RO+$Al_2O_3$−$B_2O_3$;
0 mol %≤$R_2O$≤2 mol %; and
$SiO_2$, $Al_2O_3$, $B_2O_3$, $P_2O_5$, $Na_2O$, $K_2O$, MgO, ZnO, CaO, SrO, BaO, $SnO_2$, $As_2O_3$, $Sb_2O_3$, $R_2O$, and RO represent the mol percents of the representative oxide components.

Silica

In the embodiments of the glass compositions described herein, $SiO_2$ is the largest constituent of the composition and, as such, is the primary constituent of the resulting glass network. $SiO_2$ enhances the chemical durability of the glass and, in particular, the resistance of the glass composition to decomposition in acid and the resistance of the glass composition to decomposition in water. If the content of $SiO_2$ is too low, the chemical durability and chemical resistance of the glass may be reduced and the glass may be susceptible to corrosion. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the first embodiment, the silica content of substrate 110 is 65 mol %≤$SiO_2$≤75 mol %. In a tenth embodiment, 69 mol %≤$SiO_2$≤72 mol %. The $SiO_2$ content may be 65, 66, 67, 68, 69, 70, 71, 72, 73, 74 or 75 mol %, or any range having any two of the preceding values as endpoints.

Many methods of forming vias in glass involve the use of acid to etch the glass. For example, one method involves forming a damage track through the glass with a laser, and exposing the glass to acid. The acid permeates the damage track, removing the glass from the volume of the damage track. But, the acid may also etch and remove undamaged regions of the glass. A high silica content helps slow this etching of undamaged regions, which may be desirable.

$Al_2O_3$

The glass compositions described herein further include $Al_2O_3$. $Al_2O_3$, in conjunction with alkaline earth oxides and ZnO (RO) present in the glass compositions, leads to a low surface roughness glass surface after etching with etchants such as HF. $Al_2O_3$ may also increase the hardness and damage resistance of the glass. However, the liquidus viscosity of the glass decreases with increasing concentration of the $Al_2O_3$ in the glass compositions. If the concentration of $Al_2O_3$ in the glass compositions is too great, the liquidus viscosity of the glass composition decreases, which may cause the glass composition to crystallize during production in a fusion downdraw process. In addition, including too much $Al_2O_3$ may make it difficult to have a desirably high $SiO_2$ content while also including all other desirable glass components. In the first embodiment, the $Al_2O_3$ content of substrate 110 is 7 mol %≤$Al_2O_3$≤15 mol %. The $Al_2O_3$ content may be 7, 8, 9, 10, 11, 12, 13, 14 or 15 mol %, or any range having any two of the preceding values as endpoints.

RO

The glass compositions described herein further include alkaline earth oxides and ZnO. Alkaline earth oxides include MgO, CaO, SrO, and BaO. ZnO, while technically not an alkaline earth oxide, is believed to have a similar effect on the glass composition for purposes of this disclosure. "RO" is used to refer collectively to MgO, CaO, SrO, BaO and ZnO. And, the RO content of the glass composition is the sum of the glass content of MgO, CaO, SrO, BaO and ZnO, in mol %. Increasing the RO content is one way to decrease the post etch roughness of the glass surface after etching with etchants such as HF. And, the use of RO does not have the poisonous effect of $R_2O$. In the first embodiment, 26.25 mol %≤RO+$Al_2O_3$−$B_2O_3$. Because the maximum amount of $Al_2O_3$ is 15 mol %, this means that the RO content is at least 11.25 mol %. In some embodiments, the parameter RO+$Al_2O_3$−$B_2O_3$ is greater than or equal to 26.25, 26.5, 26.75 or 27.0 mol %. Even higher values for this parameter may be used. But, at values higher than 27.5 mol %, it is believed that the parameter may increase the coefficient of thermal expansion (CTE) of the material to undesirably high levels for some applications.

RO oxides are added to improve the melting properties of the glass composition during processing, while also adjusting properties of the glass such as coefficient of thermal expansion (CTE) and density to desirable values. Small amounts of CaO and MgO can help with glass melting and improve the glass liquidus viscosity. But, above 6 mol %, CaO and MgO can detrimentally affect glass liquidus performance, and lead to devitrification during glass melting. ZnO improves glass hardness and modulus. But, ZnO also increases glass density and, in amounts higher than 4 mol %, can deteriorate glass compaction. BaO and SrO are both good for glass formability and thermal stability. But, BaO and SrO are relatively expensive, and also increase glass density. For these reasons, BaO and SrO are not above 10 mol %.

BeO and RaO are also alkaline earth oxides that should affect glass properties in a way similar to the other RO. But, they are generally not deliberately included in glass compositions due to their high cost.

$R_2O$

The amount of alkali oxides in the glass composition is minimized. Alkali oxides may include one or more of $Li_2O$, $Na_2O$, $K_2O$, $Rb_2O$, and $Cs_2O$. "$R_2O$" is used to generally refer to the alkali oxides. And, the $R_2O$ content of the glass composition is the sum of the glass content of $Li_2O$, $Na_2O$, $K_2O$, $Rb_2O$, and $Cs_2O$, in mol %. Increasing the content of alkali oxides is one way to decrease the post etch roughness of the glass surface after etching with etchants such as HF, which is desirable. But, alkali oxides may have detrimental effects for some applications. For example, where a glass substrate is used to provide through glass vias (TGV), the presence of alkali oxides may poison the types of devices typically connected by the TGV. For one type of device where TGV shows promise, RF (radio frequency) devices such as RF antennae, the presence of $R_2O$ undesirably lowers the transmittance of the glass. High transmittance is desired for better signal transfer. In the first embodiment, the $R_2O$ content is 0 mol %≤$R_2O$≤2 mol %. The $R_2O$ content may be 0 mol %≤$R_2O$≤2 mol %, 0 mol %≤$R_2O$≤1 mol %, or 0 mol %≤$R_2O$≤0.5 mol %. In some embodiments, the glass composition is free of $R_2O$—$R_2O$ may be present only in tramp amounts.

Other Components

The glass compositions may also include phosphorous oxide ($P_2O_5$). The presence of $P_2O_5$ increases the liquidus viscosity of the glass compositions by suppressing the crystallization of mullite in the glass compositions. The liquidus temperature of the glass compositions increases rapidly when the amount of $Al_2O_3$ exceeds the sum of the amounts of alkali oxides ($R_2O$ mol. %) and alkaline earth oxides (RO mol. %) in the glass composition by more than 2 mol. %, or even by more than 1 mol. %. This issue is particularly acute for the compositions described herein, which have a limited amount of $R_2O$. When $Al_2O_3$ (mol. %) is greater than ($R_2O$ (mol. %)+RO (mol. %)) by more than 1 mol. %, the presence of $P_2O_5$ in the glass composition compensates for the excess $Al_2O_3$ by decreasing the liquidus temperature, thus, increasing the liquidus viscosity of the glass composition. In some embodiments, the glass compositions may have an amount of $P_2O_5$ sufficient to compensate for the excess $Al_2O_3$. For example, in some embodiments, the glass compositions may have an amount of $P_2O_5$ sufficient so that ($Al_2O_3$ (mol. %)−$R_2O$ (mol. %)−RO (mol. %)−$P_2O_5$ (mol. %)) is less than or equal to 2 or even less than or equal to 1. In some embodiments, the glass compositions do not include $P_2O_5$. In this case, it may be that the amounts of $Al_2O_3$ and RO are such that the liquidus temperature does not increase rapidly. Or, it may be that a higher liquidus temperature is tolerable for the application. But, if the $P_2O_5$ content of the glass is too high, it may result in undesirable compaction, which is permanent shrinkage of the glass when heated. Some via fill processes use temperatures of 600 C or higher, so compaction can be a serious issue. In the second embodiment, the $P_2O_5$ content is 0 mol %≤$P_2O_5$≤2 mol %. The $P_2O_5$ content may be 0, 1 or 2 mol %, or any range having any two of the preceding values as endpoints.

Boron oxide ($B_2O_3$) is a flux which may be added to glass compositions to reduce the viscosity of the glass at a given temperature (e.g., the temperature corresponding to the viscosity of 200 poise, at which glass is melted and which is usually the highest temperature in the glass melting furnace) thereby improving the quality and formability of the glass. The presence of $B_2O_3$ may also improve damage resistance of the glass made from the glass composition. In the first embodiment, the $B_2O_3$ content is 0.1 mol %≤$B_2O_3$≤2 mol %. As with $P_2O_5$, too much $B_2O_3$ may result in undesirable compaction if the glass is heated. The $B_2O_3$ content may be 0.1, 0.5, 1, 1.5 or 2 mol %, or any range having any two of the preceding values as endpoints.

In addition to the components described elsewhere, the glass compositions described herein may optionally further include one or more fining agents such as, for example, $SnO_2$, $As_2O_3$ or $Sb_2O_3$ The fining agents may be included in the glass composition to minimize or eliminate bubbles in the glass composition during formation. However, the fining agents generally have low solubility in the glass composition. Thus, if the amount of fining agents in the glass composition is too great, devitrification of the fining agents may occur during fusion forming. And, fining agents may be relatively expensive. So, when fining agents are included, it is desirable to include them in the lowest amounts needed to achieve the desired result. When a fining agent is present in the glass composition, the fining agent may be present in an amount less than or equal to 0.5 mol. %, less than or equal to 0.2 mol. %, or even less than or equal to 0.1 mol. %. In the second embodiment, the $SnO_2$ content is 0 mol %≤$SnO_2$≤0.5 mol %. The $SnO_2$ content may be 0, 0.1, 0.2, 0.3, 0.4, or 0.5 mol %, or any range having any two of the preceding values as endpoints. In the second embodiment, the $As_2O_3$ content is 0≤$As_2O_3$≤0.5 mol %. The $As_2O_3$ content may be 0, 0.1, 0.2, 0.3, 0.4, or 0.5 mol %, or any range having any two of the preceding values as endpoints. In the second embodiment, the $Sb_2O_3$ content is 0≤$Sb_2O_3$≤0.5 mol %. The $Sb_2O_3$ content may be 0, 0.1, 0.2, 0.3, 0.4, or 0.5 mol %, or any range having any two of the preceding values as endpoints.

The glass compositions may include less than 0.05 mol. % tramp compounds, such as manganese compounds, cerium compounds, hafnium compounds, or other compounds, that may make it into the glass composition as impurities in the metal oxides deliberately included in the composition. Tramp compounds may also enter the glass composition through contact with processing equipment, such as refractory components of a fusion downdraw forming process, or the like.

Creation of Vias in Substrates

Figure 3:
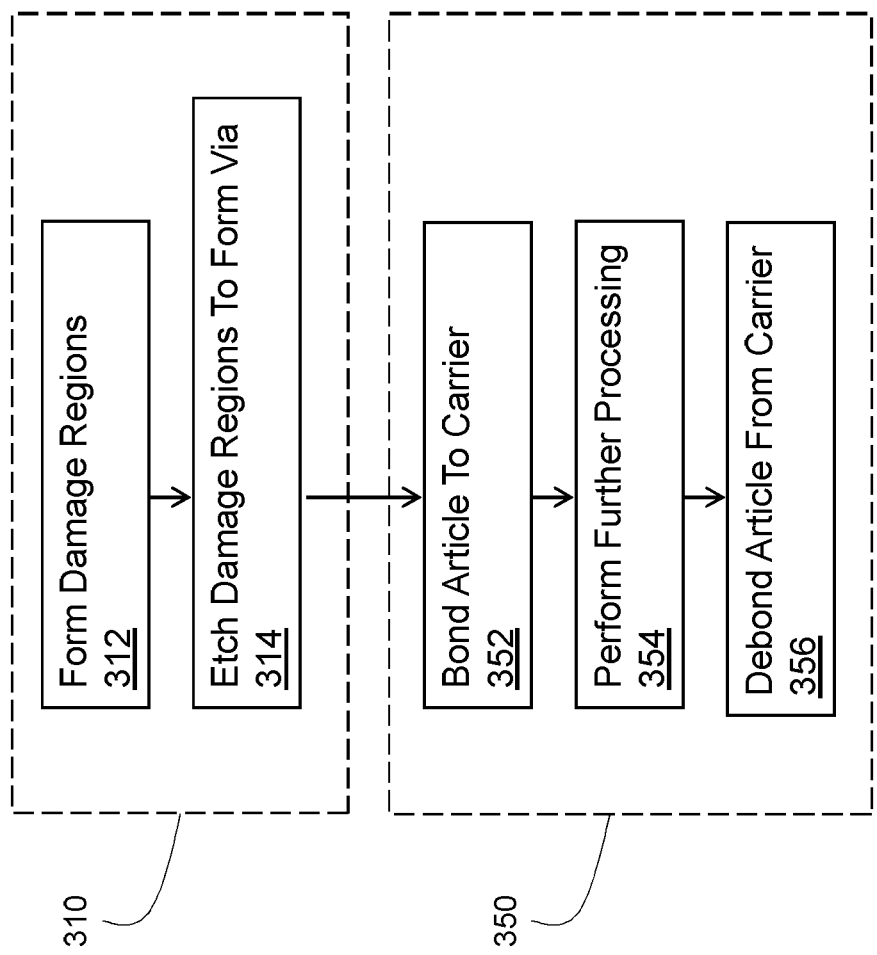
FIG. 3 shows a process for forming vias in a substrate that involves an etching step.

FIG. 3 shows a flowchart of a process 300 for creating and subsequently processing article 100. Process 300 includes process 310, which includes steps for the creation of vias in a substrate to create article 100. Process 300 also includes process 350, which includes bonding article 100 to a carrier, performing additional processing, and debonding article 100 from the carrier.

Process 310 comprises, in order:
Step 312: Form damage regions in substrate
Step 314: Etch damage regions to form via
Damage Region Formation In step 310, damage regions 120 are formed in substrate 100. Damage regions 120 may be formed in the substrate 110 in a variety of ways.

In some embodiments, a high energy laser pulse may be applied to create damage regions 120 through the substrate 110. Damage regions 120 allows etchant to flow therein during downstream etching processes. In some embodiments, damage regions 120 may be a line of laser-induced damage formed by a pulsed laser. The pulsed laser may form the damage line by non-linear multi-photon absorption, for example. When subsequently etched, the rate of material removal within such a damage region 120 is faster than the rate of material removal outside damage region 120. Exemplary ways for performing the laser damage creation and subsequent etching are disclosed in U.S. Pat. No. 9,278,886 and U.S. Pub. No. 2015/0166395, each of which is hereby incorporated by reference in its entirety. In some embodiments, a laser may be used to form an ablated hole instead of damage regions, and the ablated hole may be widened by etching.

Figure 4:
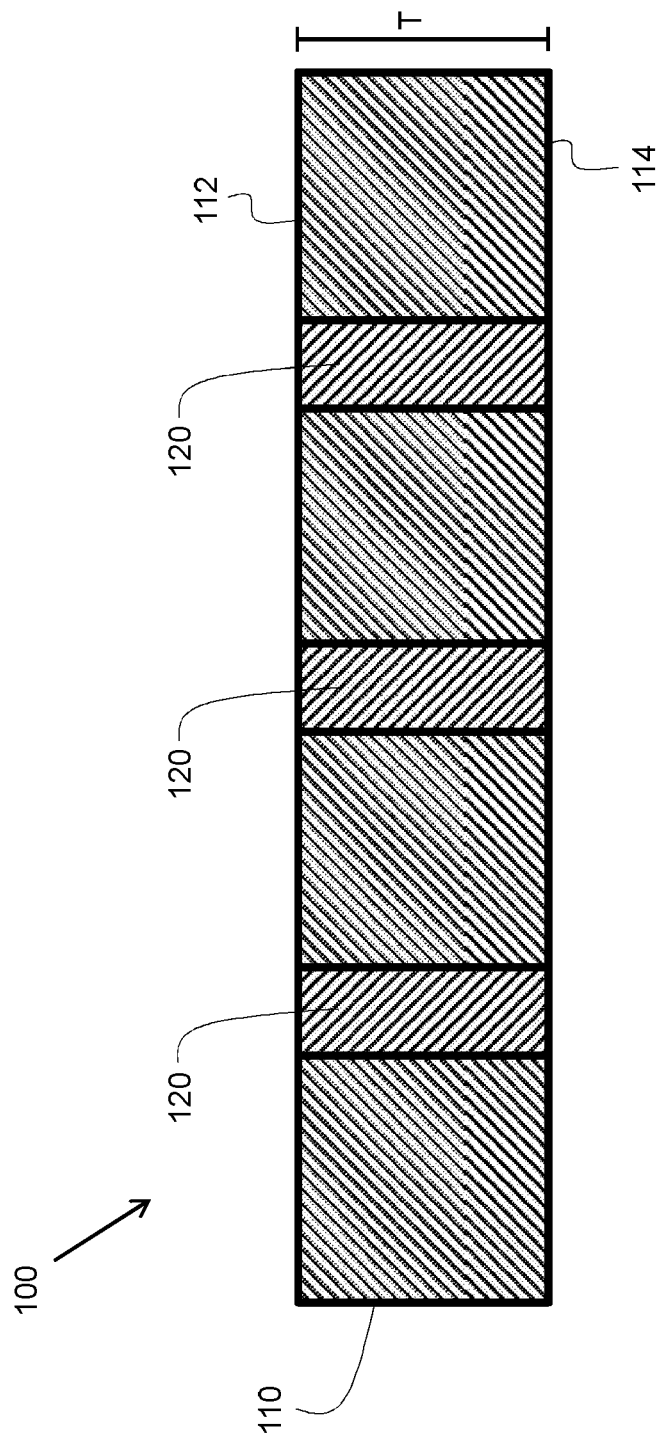
FIG. 4 shows a substrate with damage regions.

FIG. 4 shows a cross section of an example article after step 310, but before step 320. Damage regions 120 are formed in substrate 110. While FIG. 4 shows cylindrical damage regions 120 for purposes of illustration, damage regions 120 may have an arbitrary shape. Damage regions 120 may be smaller than the ultimately desired vias 124 to account for removal of material during etching.

Etching

In step 320, damage regions 120 are etched to form vias 124 (or vias with other geometries, for example vias 224).

Etching processes may include submerging the glass article 100 in an etchant 180 bath. Additionally or alternatively, the etchant 180 may be sprayed onto the glass article 100. The etchant 180 may remove material of the substrate 110 to enlarge damage regions 120. Any suitable etchants and etching methods may be utilized. Non-limiting examples of etchants include strong mineral acids such as nitric acid, hydrochloric acid, acylic acid or phosphoric acid; fluorine containing etchants such as hydrofluoric acid, ammonium bifluoride, sodium fluoride, and the like; and mixtures thereof. In some embodiments, the etchant is hydrofluoric acid.

FIGS. 1 and 2 illustrate substrate 100 after etching has occurred for different via geometries.

The etching of step 320 may expose parts of substrate 100 other than damage regions 120 to etchant, including one or both first surface 112 and second surface 114. This exposure may lead to etching of these other parts, which can cause an increased surface roughness (Ra). When using conventional alkali-free glass materials for substrate 110, surface roughness (Ra) may be undesirably increased to values higher than 0.75 nm, or even higher than 1.0 nm. This high surface roughness may render substrate 100 unsuitable for the Van der Waals bonding process described below.

Unexpectedly, the alkali-free glass compositions described herein exhibit a low post-etch roughness, notwithstanding the absence or low amounts of alkali oxide in the compositions. This low post-etch roughness is suitable for the Van der Waals bonding process described below. And, because the glass compositions have a low alkali ($R_2O$) content, they are particularly well suited for use in applications the presence of alkali may be undesirable or damaging to the final product. For example, a substrate 100 made from the compositions described herein may have first surface 112 and/or second surface 114 with a post-etch surface roughness (Ra) of 0.75 nm or less, 0.7 nm or less, 0.65 nm or less, 0.6 nm or less, 0.55 nm or less, or 0.5 nm or less. This low surface roughness may enable the use of the Van der Waals bonding process described below, even though the glass composition is low-alkali or alkali-free.

A glass surface that has been etched has distinctive structural characteristics, and one of skill in the art can tell from inspecting a glass surface whether that surface has been etched. Etching often changes the surface roughness of the glass. So, if one knows the source of the glass and the roughness of that source, a measurement of surface roughness can be used to determine whether the glass has been etched. In addition, etching generally results in differential removal of different materials in the glass. This differential removal can be detected by techniques such as electron probe microanalysis (EPMA).

Bonding and Post-Etch Processing

FIG. 3 also shows process 350, which is post-etch processing using a carrier. Process 350 comprises, in order:
Step 352: Bond article 100 to a carrier
Step 354: Perform further processing
Step 356: Debond article 100 from the carrier
For example, substrate 110 may be destined for use as an interposer, and may be subjected to further processing steps (step 320) to impart additional interposer properties.

Glass interposers may be very thin (e.g., anywhere from less than 300 μm to 700 μm). Such thin material may be difficult to handle during fabrication procedures because of the fragility and lack of stiffness of the substrate 110. To counteract the fragility and lack of stiffness, it is desirable to removably bond (step 352) substrate 110 to a carrier 200 after vias 124 have been formed, so that damage to substrate 110 may be avoided during further processing (step 354).

Van der Waals Bonding

One exemplary method of removably bonding a substrate 110 to a carrier is by using Van der Waals bonding such as disclosed by U.S. patent Publication No. 2014/0170378, which is incorporated by reference in its entirety. For example, Van der Waals bonding may include disposing a surface of an article on a bonding surface of a carrier and raising a temperature of the article followed by cooling the article to room temperature. The result is the article and the carrier being removably bonded together. Van der Waals bonding is beneficial to downstream processing because of its ability to form bonds that are capable of withstanding processing (e.g., high temperature processing), while allowing the entire area of the substrate to be debonded (step 356) from the carrier 200 when desired, either all at once or in sections. After substrate 110 has been debonded, carrier 200 may be re-used for processing additional substrates.

The challenge of using Van der Waals surface bonding techniques for bonding substrates is that the roughness of the surfaces' being bonded together impacts the ability of the surfaces to be bonded. As a non-limiting example, surface roughness (Ra) greater than 0.75 nm or 1.0 nm may substantially prevent spontaneous bonding, result in weak bonding of the substrate 110 to the carrier 200. Weak bonding may permit liquids from one or more processes to infiltrate between the substrate 110 and the carrier 200, thereby leading to de-lamination or to process contamination as residue from one process may impact later processes. In the configuration shown in FIG. 5, the surface roughnesses (Ra) of second surface 114 and bonding surface 210 affects the ability of substrate 110 to bond to carrier 200.

Figure 5:
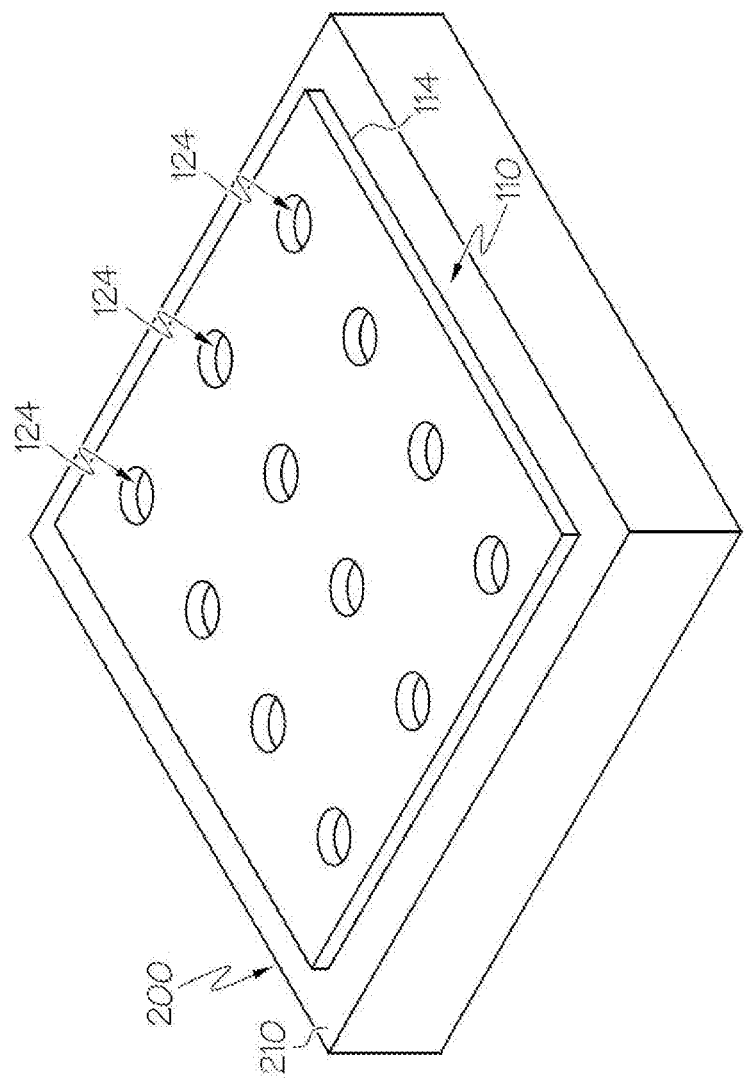
FIG. 5 shows a substrate with vias bonded to a carrier.

FIG. 5 illustrates substrate 110 removably bonded to carrier 200. Second surface 114 of substrate 110 is bonded to bonding surface 210 of carrier 200.

Carrier

Carrier 200 may be of any suitable material, such as glass, for example. Carrier 200 need not be glass, but instead may be ceramic, glass-ceramic, or metal, for example. If made of glass, carrier 200 may be of any suitable composition including, but not limited to, aluminosilicate, borosilicate, aluminoborosilicate, soda lime silicate, and may be either alkali containing or alkali-free depending upon its ultimate application. Carrier 200 may have any suitable thickness. Carrier 200 may be made of one layer, as shown, or multiple layers (including multiple thin sheets) that are bonded together (e.g., by lamination). The coefficient of thermal expansion of the carrier 200 may be substantially matched with that of substrate 110 to prevent warping of substrate 110 or decoupling of substrate 110 from carrier 200 during processing at elevated temperatures. Carrier 200 is not necessarily exposed to the same etching process as substrate 110, because the purpose of 200 is to provide support to substrate 100 during post-etch processing-carrier 200 typically does not have vias, and need not be exposed to the etching processes used to create vias. So, bonding surface 210 of carrier 200 may have a lower surface roughness (Ra) than that of first surface 112 and second surface 114 of substrate 110, which are exposed to etchant.

When considering the ability to form a suitable Van der Waals bond, the surface roughness (Ra) of the substrate 110 is additive to the surface roughness of the carrier 200. For good Van der Waals bonding, the sum of the surface roughness of the carrier and the substrate should be 0.95 nm or less, and preferably 0.9 nm or less. Fusion drawn glass, which is among the lowest roughness glasses that may be obtained at reasonable cost, has a typical surface roughness of 0.2 nm to 0.4 nm. Fusion drawn glass with a surface roughness of 0.2 nm may be obtained by appropriately selecting the glass composition. So, it is recommended to select a carrier with a surface roughness as low as possible that may be achieved at reasonable cost, which at the present time, is about 0.2 nm. So, for Van der Waals bonding between a substrate and a carrier to work well, where the carrier has a surface roughness of about 0.2 nm, the surface roughness of the substrate should be 0.75 nm or less, and preferably 0.7 nm or less.

Further Processing

The further processing of step 354 may include steps such as applying alkaline cleaning solutions to the substrate 110, wet etching the substrate 110, polishing the substrate 110, metal plating the substrate 110, metal patterning the substrate 110 by wet etching, depositing material onto the substrate 110 by deposition, and annealing the substrate 110. If substrate 110 were not bonded to carrier 200, this robust further processing would likely damage substrate 110. But, because substrate 110 is bonded to carrier 200, this further processing is far less likely to damage substrate 110.

De-Bonding

Debonding may be accomplished by any suitable means. For example, a wedge may be used at an outer portion of the bonded substrate 110 and carrier 200 to initiate debonding, followed by peeling. Examples of suitable debonding techniques are described in PCT Publication WO 2017/127489, "Methods for Processing a Substrate."

Examples

The following Comparative Examples and Examples compare changes in surface roughness (Ra) as a result of acid etching.

Sixteen glass samples prepared by the fusion draw process were obtained. Each glass sample was 0.7 mm thick and did not have damage regions. The surface roughness (Ra) of each sample was measured prior to etching, as shown in Table 1. Unless otherwise specified, surface roughness in the examples was measured by a Veeco Dimension ICON AFM with the following parameters: 1 Hz, 512 scans/line, and 2 micron image size.

Figure 6:
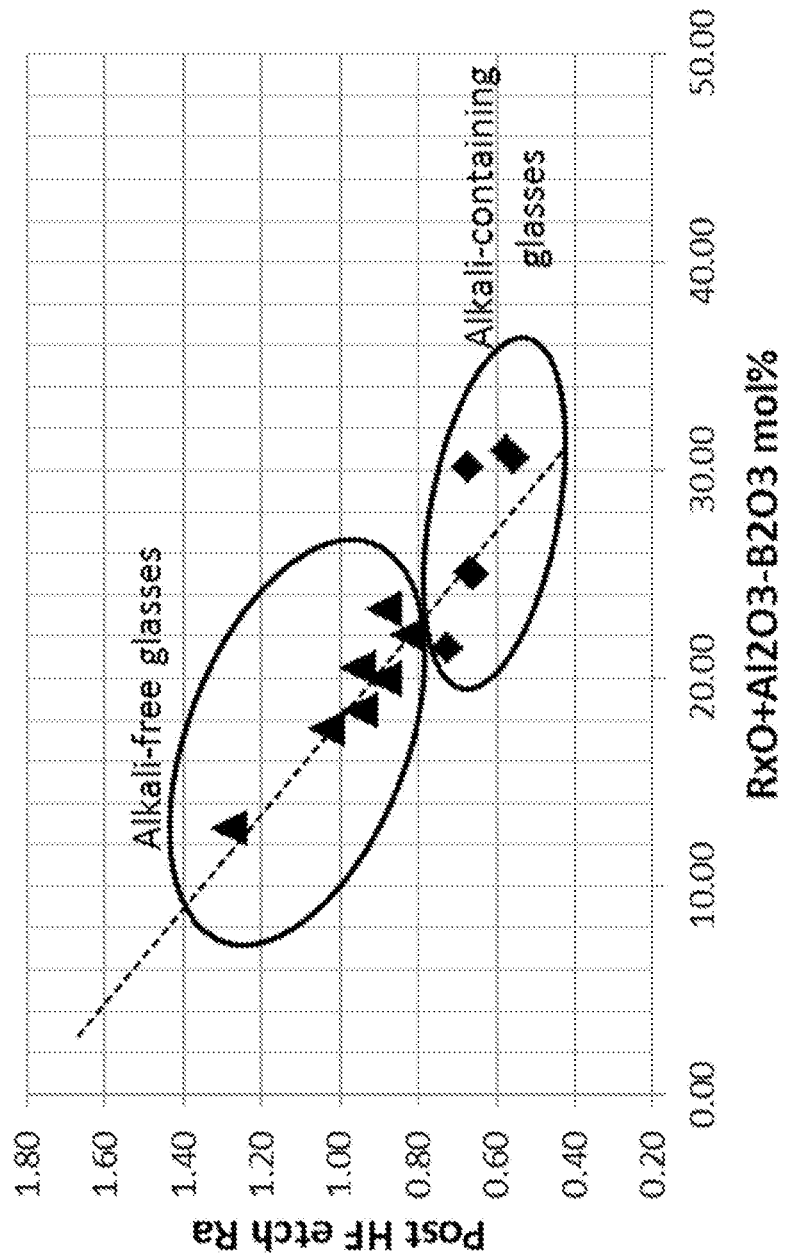
FIG. 6 shows a plot of post etch roughness (Ra) v. a glass composition parameter, $RO+Al_2O_3-B_2O_3$.
Figure 7:
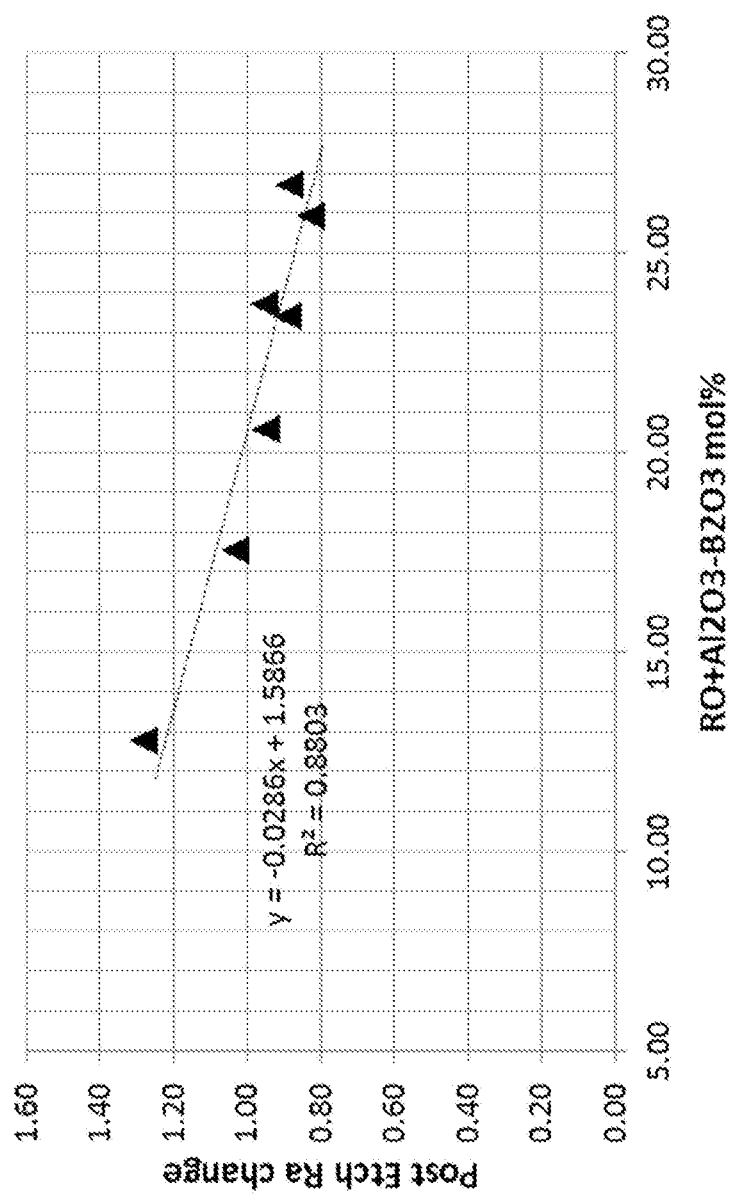
FIG. 7 shows an expanded portion of the plot of FIG. 6.

Table 1 and FIG. 6 show the parameter $RO+Al_2O_3-B_2O_3$ for each of the glass samples. Samples 1 through 7 also met the criteria: wherein the glass substrate comprises, in mol percent on an oxide basis:

65 mol % $\leq SiO_2 \leq$ 75 mol %;
7 mol % $\leq Al_2O_3 \leq$ 15 mol %;
0.1 mol % $\leq B_2O_3 \leq$ 2 mol %;
0 mol % $\leq P_2O_5 \leq$ 2 mol %;
0 mol % $\leq MgO \leq$ 6 mol %;
0 mol % $\leq ZnO \leq$ 4 mol %;
0 mol % $\leq CaO \leq$ 6 mol %;
0 mol % $\leq SrO \leq$ 10 mol %;
0 mol % $\leq BaO \leq$ 10 mol %;
0 mol % $\leq SnO_2 \leq$ 0.5 mol %;
0 mol % $\leq As_2O_3 \leq$ 0.5 mol %;
0 mol % $\leq Sb_2O_3 \leq$ 0.5 mol %;

wherein:
$RO = MgO + CaO + SrO + BaO + ZnO$;
$R_2O = Li_2O + Na_2O + K_2O + Rb_2O + Cs_2O$
0 mol % $\leq R_2O \leq$ 2 mol %; and
$P_2O_5$, $Na_2O$, $K_2O$, $SnO_2$, $As_2O_3$, $Sb_2O_3$, represent the mol percents of the representative oxide components.

None of the samples tested satisfied the criteria: 26.25 mol % $\leq RO+Al_2O_3-B_2O_3$. But, the tested samples do show the trend in post-HF surface roughess that occurs as the parameter 26.25 mol %≤RO+Al$_2$O$_3$−B$_2$O$_3$ is varied.

The glass samples were then cleaned with a high pH detergent wash (2% Semiclean-KG, 60° C. for 4 minutes) and a deionized (DI) water rinse. The cleaned glasses were etched in 2.5 wt % HF (or 1.45M HF) to remove 5 microns of glass surface. The etched glasses were cleaned by a second high pH detergent wash and DI water rinse.

After etching and cleaning, the surface roughness of each sample was measured again, as shown in Table 1.

TABLE 1

| Sample | RO + Al$_2$O$_3$ − B$_2$O$_3$ (mol %) | Pre-etch R$_a$ (nm) | Post-etch R$_a$ (nm) |
|---|---|---|---|
| 1 | 17.57 | 0.34 | 1.03 |
| 2 | 20.59 | 0.34 | 0.95 |
| 3 | 12.80 | 0.37 | 1.28 |
| 4 | 23.73 | 0.30 | 0.95 |
| 5 | 23.42 | 0.29 | 0.89 |
| 6 | 25.94 | 0.28 | 0.82 |
| 7 | 26.70 | 0.54 | 0.88 |

Compositions that satisfy the criteria 26.25 mol %≤RO+Al$_2$O$_3$−B$_2$O$_3$ include the following:

TABLE 2

| Sample | SiO$_2$ | B$_2$O$_3$ | Al$_2$O$_3$ | MgO | CaO | SrO | SnO$_2$ | BaO | ZnO | RO + Al$_2$O$_3$—B$_2$O$_3$ mol % |
|---|---|---|---|---|---|---|---|---|---|---|
| A | 69.0 | 1.8 | 13.3 | 5.0 | 5.3 | 1.5 | 0.1 | 3.0 | 1.0 | 27.3 |
| B | 68.0 | 1.0 | 15.0 | 4.0 | 5.0 | 2.0 | 0.1 | 2.9 | 2.0 | 29.9 |
| C | 68.0 | 1.0 | 15.0 | 4.0 | 5.0 | 3.0 | 0.1 | 3.9 | 1.0 | 30.9 |

The compositions of Table 2 are provided as prophetic examples. The values in Table 2 are in mol %.

CONCLUSION

It should be understood that embodiments described herein provide for forming vias in substrates without substantially increasing the surface roughness (Ra) of the substrate. By preserving the low surface roughness of the substrate during via formation, the substrate may be removably bonded to a carrier for further processing. After processing, the substrate may be removed from the carrier, such that the carrier may be reused for processing further substrates. Furthermore, the through vias may be made substantially cylindrical because they may be etched from both ends.

While specific procedures involving the etching of vias and the use of a carrier are described herein, the glass compositions described herein may be advantageously used with a variety of different processes involving etching where a low post-etch surface roughness is desired.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "tramp," when used to describe a particular constituent component in a glass composition, refers to a constituent component that is not intentionally added to the glass composition and is present in amounts less than 0.05 mol. %. Tramp components may be unintentionally added to the glass composition as an impurity in another constituent component or through migration of the tramp component into the composition during processing of the glass composition.

The embodiments illustrated in the figures are not necessarily to scale. Relative sizes and widths may have been selected for ease of illustration.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An article, comprising:
a glass substrate comprising:
a first surface having a plurality of vias therein; and
a second surface parallel to the first surface;
wherein at least one of the first surface and the second surface is an etched surface having a surface roughness (Ra) of 0.75 nm or less;
wherein the glass substrate comprises, in mol percent on an oxide basis:
65 mol %≤SiO$_2$≤72 mol %;
7 mol %≤Al$_2$O$_3$≤15 mol %;
0.1 mol %≤B$_2$O$_3$≤2 mol %;
1 mol %≤P$_2$O$_5$≤2 mol %;
wherein:
RO=MgO+CaO+SrO+BaO+ZnO;
R$_2$O=Li$_2$O+Na$_2$O+K$_2$O+Rb$_2$O+Cs$_2$O
26.25 mol %≤RO+Al$_2$O$_3$−B$_2$O$_3$;
0 mol %≤R$_2$O≤2 mol %; and
SiO$_2$, Al$_2$O$_3$, B$_2$O$_3$, MgO, ZnO, CaO, SrO, BaO, R$_2$O, and RO represent the mol percents of the representative oxide components.

2. The article of claim 1, wherein the glass substrate comprises, in mol percent on an oxide basis:
65 mol %≤SiO$_2$≤75 mol %;
7 mol %≤Al$_2$O$_3$≤15 mol %;
0.1 mol %≤B$_2$O$_3$≤2 mol %;

0 mol % ≤ $P_2O_5$ ≤ 2 mol %;
0 mol % ≤ MgO ≤ 6 mol %;
0 mol % ≤ ZnO ≤ 4 mol %;
0 mol % ≤ CaO ≤ 6 mol %;
0 mol % ≤ SrO ≤ 10 mol %;
0 mol % ≤ BaO ≤ 10 mol %;
0 mol % ≤ $SnO_2$ ≤ 0.5 mol %;
0 mol % ≤ $As_2O_3$ ≤ 0.5 mol %;
0 mol % ≤ $Sb_2O_3$ ≤ 0.5 mol %;
wherein:
$P_2O_5$, $Na_2O$, $K_2O$, $SnO_2$, $As_2O_3$, $Sb_2O_3$, represent the mol percents of the representative oxide components.

3. The article of claim 1, wherein 69 mol % ≤ $SiO_2$ ≤ 72 mol %.

4. The article of claim 1, wherein 0 mol % ≤ $R_2O$ ≤ 1 mol %.

5. The article of claim 1, wherein 0 mol % ≤ $R_2O$ ≤ 0.5 mol %.

6. The article of claim 1, wherein the glass substrate further comprises at least one of, in mol percent on an oxide basis: (i) 0.3 mol % ≤ $As_2O_3$ ≤ 0.5 mol %, and (ii) 0.3 mol % ≤ $Sb_2O_3$ ≤ 0.5 mol %.

7. The article of claim 1, wherein the glass substrate further comprises at least one of, in mol percent on an oxide basis: (i) 0.4 mol % ≤ $As_2O_3$ ≤ 0.5 mol %, and (ii) 0.4 mol % ≤ $Sb_2O_3$ ≤ 0.5 mol %.

8. The article of claim 1, wherein 26.5 mol % ≤ RO+$Al_2O_3$-$B_2O_3$.

9. The article of claim 8, wherein 26.75 mol % ≤ RO+$Al_2O_3$-$B_2O_3$.

10. The article of claim 9, wherein 27.0 mol % ≤ RO+$Al_2O_3$-$B_2O_3$.

11. The article of claim 1, wherein the glass substrate has a thickness of 150 μm or less.

12. The article of claim 1, wherein the glass substrate has a thickness of 90 μm to 110 μm.

13. The article of claim 1, wherein the article is the glass substrate.

14. The article of claim 1, wherein the plurality of vias are through vias extending from the first surface to the second surface.

15. The article of claim 1, wherein the plurality of vias are blind vias extending from the first surface toward the second surface without reaching the second surface.

16. The article of claim 1, the article further comprising a carrier; wherein at least one of the first surface and the second surface is etched, has a surface roughness (Ra) of 0.75 nm or less and is bonded to the carrier.

17. The article of claim 6, wherein the carrier has a surface roughness (Ra) of 0.2 nm to 0.4 nm.

* * * * *

UNITED STATES PATENT AND TRADEMARK OFFICE
CERTIFICATE OF CORRECTION

PATENT NO. : 11,554,984 B2
APPLICATION NO. : 16/272305
DATED : January 17, 2023
INVENTOR(S) : Timothy Michael Gross et al.

It is certified that error appears in the above-identified patent and that said Letters Patent is hereby corrected as shown below:

On the Title Page

On the page 8, in Column 2, item (56) under "Other Publications", Line 9, delete "pluse" and insert -- pulse --.

On the page 8, in Column 2, item (56) under "Other Publications", Line 9, delete "anc" and insert -- and --.

On the page 8, in Column 2, item (56) under "Other Publications", Line 31, delete "silversodium" and insert -- silver-sodium --.

On the page 8, in Column 2, item (56) under "Other Publications", Line 42, delete "(Ultraviolet" and insert -- Ultraviolet --.

On the page 8, in Column 2, item (56) under "Other Publications", Line 46, delete "micro-achitecture," and insert -- micro-architecture, --.

On the page 8, in Column 2, item (56) under "Other Publications", Line 50, delete "(1993." and insert -- (1993). --.

On the page 8, in Column 2, item (56) under "Other Publications", Line 62, delete "oflerephthalic" and insert -- of terephthalic --.

On the page 9, in Column 1, item (56) under "Other Publications", Line 20, delete "Microelectron is" and insert -- Microelectronics --.

On the page 9, in Column 1, item (56) under "Other Publications", Line 23, delete "Formthe" and insert -- From the --.

Signed and Sealed this
Twenty-fifth Day of July, 2023

Katherine Kelly Vidal
*Director of the United States Patent and Trademark Office*

CERTIFICATE OF CORRECTION (continued)

On the page 9, in Column 1, item (56) under "Other Publications", Line 60, delete "ultrashod" and insert -- ultrashort --.

On the page 9, in Column 1, item (56) under "Other Publications", Line 63, delete "ofSPIEvol." and insert -- of SPIE vol. --.

On the page 9, in Column 2, item (56) under "Other Publications", Line 1, delete "C02" and insert -- CO2 --.

On the page 9, in Column 2, item (56) under "Other Publications", Line 35, delete "atmosphericpressure" and insert -- atmospheric pressure --.

On the page 9, in Column 2, item (56) under "Other Publications", Line 37, delete "EuropeTec" and insert -- EuropTec --.

On the page 10, in Column 1, item (56) under "Other Publications", Line 21, delete "Coming" and insert -- Corning --.

On the page 10, in Column 1, item (56) under "Other Publications", Line 23, delete "Coming" and insert -- Corning --.

On the page 10, in Column 2, item (56) under "Other Publications", Line 31, delete "Intergrace," and insert -- Integrace, --.

In the Claims

In Column 14, Line 57, in Claim 1, delete "$Cs_2O$" and insert -- $Cs_2O$; --.

In Column 14, Line 60, in Claim 1, before "MgO," insert -- $P_2O_5$, --.

In Column 15, Line 1, in Claim 2, above "0 mol %≤MgO≤6 mol %;" delete "0 mol %≤$P_2O_5$≤2 mol %;".

In Column 15, Line 11, in Claim 2, before "$Na_2O$," delete "$P_2O_5$,".

In Column 16, Line 5, in Claim 10, delete "9," and insert -- 8, --.

In Column 16, Line 23, in Claim 17, delete "6," and insert -- 16, --.